(12) United States Patent
Grillo et al.

(10) Patent No.: US 11,961,047 B1
(45) Date of Patent: *Apr. 16, 2024

(54) GENERATING AND PROVIDING SYNTHESIZED TASKS PRESENTED IN A CONSOLIDATED GRAPHICAL USER INTERFACE

(71) Applicant: Dropbox, Inc., San Francisco, CA (US)

(72) Inventors: Joseph Grillo, San Francisco, CA (US); Angelique Rachel Little, Aliso Viejo, CA (US); Antonia-Celestina Divan, San Anselmo, CA (US); Elijah Clay Johnson, Seattle, WA (US); Jacqueline Alexis Deprey, New York, NY (US); Robert B. Hanigan, Dripping Springs, TX (US); Swapnil Ahuja, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/190,873

(22) Filed: Mar. 27, 2023

(51) Int. Cl.
*G06F 3/0482* (2013.01)
*G06Q 10/109* (2023.01)

(52) U.S. Cl.
CPC ......... *G06Q 10/109* (2013.01); *G06F 3/0482* (2013.01)

(58) Field of Classification Search
CPC ................................................ G06F 3/048–05
See application file for complete search history.

(56) References Cited

U.S. PATENT DOCUMENTS

| | | | |
|---|---|---|---|
| 8,700,441 B1* | 4/2014 | Courage | G06Q 10/06315 705/37 |
| 9,313,162 B2 | 4/2016 | Kumar et al. | |
| 10,540,216 B2 | 1/2020 | Feijoo et al. | |
| 11,075,871 B2 | 7/2021 | Soni et al. | |
| 11,113,465 B2 | 9/2021 | Azab et al. | |
| 11,575,676 B1* | 2/2023 | Banks | G06F 3/0482 |
| 2007/0130369 A1 | 6/2007 | Nayak | |

(Continued)

OTHER PUBLICATIONS

Ignacio A., "How to Avoid Alarm Management Overload with Consolidation and Escalation," 2018, Retrieved on Dec. 20, 2023., 6 pages, Retrieved rom the internet URL: https://inductiveautomation.com/blog/how-to-avoid-alarm-management-overload-with-consolidation-and-escalation.

(Continued)

*Primary Examiner* — Daniel Rodriguez
(74) *Attorney, Agent, or Firm* — Keller Preece PLLC

(57) ABSTRACT

The present disclosure relates to systems, non-transitory computer-readable media, and methods for collecting, organizing, and managing third-party content from multiple sources associated with a user account to present as synthesized tasks in a consolidated graphical user interface and minimize the distraction provided by multiple interfaces. In particular, in one or more embodiments, the disclosed systems analyze content from various web-based data sources, collect relevant content, create synthesized tasks associated with the relevant content, and present the relevant content to the user grouped into synthesized tasks in a single graphical user interface. Additionally, the disclosed systems can prioritize the generated synthesized tasks within the graphical user interface and provide productivity metrics based on the degree to which an associated user interacts with the synthesized tasks.

20 Claims, 17 Drawing Sheets

(56) References Cited

U.S. PATENT DOCUMENTS

| | | | |
|---|---|---|---|
| 2010/0063774 A1 | 3/2010 | Cook et al. | |
| 2012/0116834 A1 | 5/2012 | Pope et al. | |
| 2012/0159341 A1 | 6/2012 | Murillo et al. | |
| 2012/0254763 A1* | 10/2012 | Protopapas | G06Q 10/109 |
| | | | 715/738 |
| 2014/0082521 A1 | 3/2014 | Carolan et al. | |
| 2014/0189017 A1* | 7/2014 | Prakash | H04W 4/029 |
| | | | 709/206 |
| 2014/0282243 A1* | 9/2014 | Eye | G06F 3/0482 |
| | | | 715/810 |
| 2015/0149620 A1 | 5/2015 | Banerjee et al. | |
| 2016/0125527 A1 | 5/2016 | Marinova | |
| 2016/0180298 A1* | 6/2016 | McClement | G06F 3/04842 |
| | | | 705/7.21 |
| 2016/0379175 A1* | 12/2016 | Bhattacharya | G06Q 10/1097 |
| | | | 705/7.21 |
| 2018/0129994 A1 | 5/2018 | Fowler et al. | |
| 2018/0232111 A1* | 8/2018 | Jones | G06F 3/0482 |
| 2019/0163533 A1 | 5/2019 | Andrews et al. | |
| 2020/0125586 A1* | 4/2020 | Rezaeian | G06F 3/048 |
| 2020/0175449 A1 | 6/2020 | Lehmann et al. | |
| 2021/0097120 A1* | 4/2021 | Gutierrez | G06F 16/9535 |
| 2021/0150489 A1* | 5/2021 | Haramati | G06Q 10/063114 |
| 2021/0216945 A1* | 7/2021 | Kapoor | G06Q 10/107 |
| 2021/0357752 A1 | 11/2021 | Chen et al. | |
| 2022/0343155 A1* | 10/2022 | Mitra | G06F 18/29 |
| 2022/0398546 A1* | 12/2022 | Lightbody | G06F 3/0482 |
| 2023/0066403 A1* | 3/2023 | Matsuoka | H04L 51/234 |

OTHER PUBLICATIONS

Non-Final Office Action from U.S. Appl. No. 18/190,865, dated Dec. 27, 2023, 17 pages.

Pagerduty, "Intelligent Alert Grouping," 2018, Retrieved on Dec. 20, 23, 7 pages, Retrieved from Internet URL: https://support.pagerduty.com/docs/intelligent-alert-grouping.

* cited by examiner

US 11,961,047 B1

GENERATING AND PROVIDING SYNTHESIZED TASKS PRESENTED IN A CONSOLIDATED GRAPHICAL USER INTERFACE

BACKGROUND

Recent years have seen significant improvements in computer technology that have led to an extensive adoption of computer-based communication and time management tools by computer users. In particular, use of tools such as email, phone applications, web and video conferencing tools, messaging tools, and online collaboration platforms has become widespread. For example, many computer users interact with a multitude of computer-based communication and time management tools daily to perform basic job functions.

Despite these advances, however, existing systems often suffer from technological shortcomings that result in a number of deficiencies particularly in regard to efficient, flexible, and functional operation. For example, the plethora of available data sources result in client devices presenting a variety of different graphical user interfaces to the user, often requiring one graphical user interface for each data source (e.g., client application). This large number of user interfaces requires an excessive amount of user interactions to coordinate the deluge of digital information provided by the multitude of client applications. Naturally, the number of sources that a user may typically need to access can result in an overwhelming number of graphical user interfaces and an overwhelming number of user interactions needed to locate, organize, and access content to perform a single task. These shortcomings can increase the burden on implementing devices resulting in longer interaction times and cause additional computational burdens for the implementing devices.

Similar to the above-discussed disadvantages, existing systems are often computationally inefficient as client devices often constantly run and access a multitude of client applications and/or perform actions with respect to multiple third-party sources. For example, in modern environments, a client device often constantly runs an email application, multiple messaging applications, one or more calendar applications, a document management application, and a host of other more specific applications. The existing systems often require the client device to swap between applications to respond to notifications from isolated sources. In turn, this requires additional system resources to be allocated by the client device to enable access to a variety of applications and to manage the application swapping mechanics. Additionally, existing systems cause the client device to inefficiently use computing resources because of the excessive number of concurrent applications that are constantly open and accessible on the client device.

Furthermore, existing systems often lack functionality. Existing systems often fail to accurately identify relationships between application data sources and, as a result, can obscure meaningful information and bombard the client device with unnecessary and redundant notifications. Existing systems often provide only limited options with regard to task management and third-party application integration. For example, existing systems often use inconvenient and generic methods to access data within third-party applications and thus require the client device to toggle between several user interfaces and applications to access relevant tasks. Additionally, existing systems often have individually customized methods of accessing data, resulting in complex processes when managing multiple applications. Because of these shortcomings, conventional systems frequently require excessive application swapping and consume additional computing resources.

These, along with additional problems and issues, exist with regard to existing systems.

BRIEF SUMMARY

One or more embodiments described herein provide benefits and/or solve one or more problems in the art with systems, methods, and non-transitory computer readable storage media that provide a task synthesis system that generates, consolidates, and prioritizes tasks from multiple data sources (e.g., multiple third-party applications) for presentation in a single user interface. For instance, the disclosed systems can automatically generate and prioritize synthesized tasks, each synthesized task containing related digital content from multiple third-party applications, for presentation within a synthesized task inbox.

In particular, the disclosed systems connect with third-party data sources associated with a user by identifying relevant third-party content from multiple applications associated with the user, determining relationships among the third-party content, and consolidating the third-party content into a synthesized task. For example, in one or more embodiments, the disclosed systems can identify and organize communication and time management tasks corresponding to different third-party data sources into a single synthesized task. To illustrate, the disclosed systems can determine interrelated email, files, and calendar items from different third-party applications and associate the data sources together into the content of a synthesized task for presentation to the user. Additionally, the disclosed systems can provide recommendations associated with the third-party sources based on the synthesized task (e.g., generate and/or enact recommended actions).

The disclosed systems can also organize relevant content from separate third-party applications into multiple synthesized tasks for presentation in a single graphical user interface. Accordingly, based on limited user interaction with a single graphical user interface, the disclosed systems can provide an intuitive and efficient way to manage tasks from multiple sources. For example, the disclosed systems can organize digital content associated with a high-priority meeting into one synthesized task and organize digital content associated with an upcoming project into a second synthesized task. Indeed, the disclosed systems can prioritize and display these synthesized tasks (e.g., display the high-priority meeting as an urgent task and the upcoming project as a non-urgent task) in one convenient location and thereby alleviate the need for multiple graphical user interfaces.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
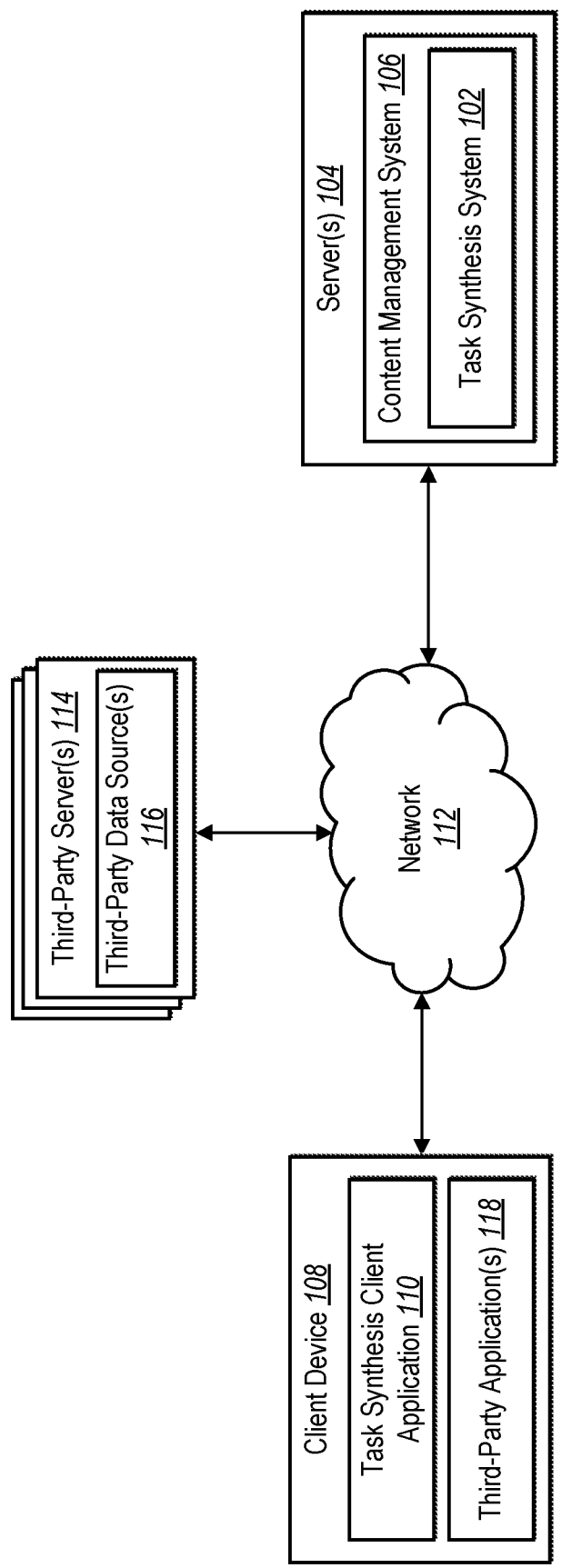
FIG. 1 illustrates an example environment within which a task synthesis system can operate in accordance with one or more embodiments.

This disclosure describes embodiments of a task synthesis system that can collect, organize, react to, and manage third-party content from various third-party data sources associated with a user account to present synthesized tasks in a consolidated graphical user interface and reduce or otherwise minimize the inefficiency of multiple graphical user interfaces associated with the various third-party data sources. For example, the task synthesis system analyzes content from various applications or web-based data sources, collects content items (e.g., emails, messages, calendar events), analyzes the content items, creates synthesized tasks associated with the content items, generates recommendations, and presents the synthesized tasks in a single graphical user interface. Additionally, the task synthesis system can prioritize the synthesized tasks within the graphical user interface and provide productivity metrics based on the degree to which an associated user interacts with, or otherwise completes, the synthesized tasks.

As mentioned, in one or more embodiments, the task synthesis system provides for display of synthesized tasks within a consolidated graphical user interface (e.g., a synthesized task inbox) after determining relationships between digital content of a variety of third-party data sources and generates synthesized tasks based on that digital content. Furthermore, the task synthesis system can provide a prioritization interface to allow a user to quickly and efficiently prioritize the synthesized tasks (e.g., based on machine learning, user input, or other methods). For example, the task synthesis system may evaluate digital content from a user's email account(s), messaging account(s), calendar(s), and/or content management system account to determine relationships between some, or all, of the content items from the third-party data sources. The task synthesis system may then generate synthesized tasks based on identifying related content from the various third-party data sources. The task synthesis system may then decrease the distractions and computational inefficiency imposed by multiple data sources by providing a synthesized task inbox and consolidating tasks or to-do items from email, messaging, calendar, and/or other data sources. Furthermore, the task synthesis system may also provide a streamlined prioritization interface to efficiently prioritize the tasks within the synthesized task inbox without the need for a user to navigate separately to each of the third-party data sources.

As part of facilitating the generation of synthesized tasks, the task synthesis system can identify related content items (e.g., an email, a message, a calendar event) from multiple third-party data sources or third-party applications. For example, the task synthesis system can use machine learning or natural language processing to identify a degree of relationship between content items from multiple third-party sources. This can include multiple content items obtained from within the same third-party source in addition to content items obtained from different third-party sources. This degree of relationship can relate to a topic, a time period, a user identification, a keyword, a key phrase, a priority indicator, an event type, or other correlation, as will be explained further below.

Additionally, the task synthesis system can prioritize the synthesized tasks. In some embodiments, the task synthesis system can determine a priority score for the synthesized tasks and present the synthesized tasks based on the priority score. For instance, the task synthesis system can display a subset of synthesized tasks based on the priority score. As another example, the task synthesis system can alter the display of a synthesized task inbox based on the priority score by reordering the synthesized tasks, emphasizing (i.e., through color, size, sound, location, intensity) the synthesized tasks with higher priority (e.g., urgent tasks, new tasks, time sensitive tasks, complicated tasks). Additionally, the task synthesis system can provide an option to update the priority scores or reprioritize the synthesized tasks.

Indeed, in one or more embodiments, a ternary structure is provided with three prioritization options to allow a user to quickly select a priority level for a given task in an efficient manner. For example, in one or more embodiments, the task synthesis system can provide the following three options for a given task: prioritize, save for later, or delete. Upon receiving a selection of a priority level for a given task, the prioritization interface populates with the next task for the user to prioritize per the ternary structure. This process repeats until the task synthesis system receives and assigns a priority level for each of the synthesized tasks. The result of the prioritization interface allows the task synthesis system to provide a prioritized list of task for a particular user on a particular day, with the prioritized list of tasks having tasks identified and generated from the various third-party data sources. In addition, the prioritization interface allows the task synthesis system to save non-urgent tasks for another day and provides additional opportunities to address those tasks, as will be explained further below with reference to FIG. 8C. Moreover, the prioritization interface allows the task synthesis system to quickly and efficiently delete unimportant tasks.

In addition, the task synthesis system can update a status associated with a synthesized task. For example, the task synthesis system can provide options to add additional content, combine, prioritize, or divide synthesized tasks. As another example, the task synthesis system can provide options to validate synthesized tasks based on a confirmation that the content items should be associated with the synthesized task. Additionally, the task synthesis system can provide tags that relate to the digital content within the synthesized tasks. These tags can include a category tag that relates to the type of task (e.g., a keywords, a key phrase, or a topic), a source tag that relates to the source or sources upon which the synthesized task is based (e.g., third-party data source(s) or user identification(s)), or a content tag that references digital content associated with the task (e.g., documents, calendar events, or user identifications) and can be selectable to help facilitate efficient access to content associated with the synthesized task.

Additionally, the task synthesis system can monitor the status of a synthesized task and user activity associated with a synthesized task. For example, the task synthesis system can monitor an interaction status of the synthesized task that is based on whether a computer system, an application, the user, or another user interacts with digital content corresponding to the synthesized task. Furthermore, the task synthesis system can suggest actions that modify the synthesized task (e.g., add content, remove content, update priority, split the task, merge the task, modify the task, mark the task complete), create additional tasks (e.g., create event, gather data, generate projects), or perform actions (e.g., send email, create message, modify file, generate calendar item).

In addition, the task synthesis system can provide feedback related to the synthesized tasks. For example, the task synthesis system can generate reports comprising statistics related to user activity associated with the synthesized tasks such as the number of completed tasks or subtasks, the amount of time the user interacted with the synthesized tasks, the time of day when the user interacted with the synthesized tasks, the day (i.e., day of the week, month, year) when the user interacted with the synthesized tasks. As another example, the task synthesis system can determine a productive time period during which the user is most productive based on identifying user activity corresponding with the synthesized tasks (e.g., competition of tasks, time spent on tasks, reorganization of tasks, analysis of third-party content related to tasks, or user provided information). Additionally, the task synthesis system can provide feedback about activity during a specified time frame related to user-completed content items, user-completed synthesized tasks, communications related to a user, a pattern of activity, or the time a user spent interacting with synthesized tasks.

Furthermore, the disclosed task synthesis systems can provide a more efficient manner of organizing and presenting information from multiple applications in a consolidated graphical interface. The disclosed task synthesis systems introduce a computational model that can automatically determine relationships between digital content in different third-party applications and present the results in real time. And the disclosed task synthesis systems can introduce an improvement to the basic function of a computational task management system by identifying and alleviating disjointed information flows and synthesizing third-party digital content into a single user interface.

The task synthesis system provides many advantages and benefits over existing systems and methods. For example, the system improves efficiency, flexibility, and functionality relative to existing systems. Specifically, the task synthesis system improves efficiency by consolidating disjointed data from various third-party data sources in a centralized graphical user interface. In contrast to existing systems that require numerous graphical user interfaces to provide information relating to individual applications and data sources, the task synthetization system can provide information for multiple applications within a single user interface on a client device. The task synthetization system dynamically generates one interface that reduces user error, requires less user navigation steps, and is computationally more efficient as the task synthetization system can replace the need to consistently execute and run the various third-party applications. Accordingly, the task synthesis system decreases the burden on implementing devices resulting in shorter interaction times and decreases the computational burdens on the implementing devices.

Further, the task synthesis system provides more flexibility relative to existing systems. For instance, the task synthesis system provides a new computational model to consolidate tasks that can efficiently associate related content from multiple data sources for presentation to the user in a single graphical user interface. Unlike existing systems which forces a user to access third-party applications in isolation, the synthesized task system can automatically determine relationships between digital content in different third-party applications in real-time (or near real-time) and present the results in a single user interface. As mentioned, the task synthesis system accurately identifies relationships between content items from different third-party applications to predict appropriate connections and priorities for digital content for presentation to the user. Indeed, the task synthesis system eliminates unnecessary steps and conserves computing resources by consolidating digital content from multiple third-party applications to provide one concise user experience and user interface.

Additionally, the task synthesis system provides a functional improvement in the way the computer operates and presents information to the user. Specifically, the task synthesis system introduces an improvement to the basic function of a computing task management system by identifying and alleviating disjointed information flows and synthesizing third-party content items into a single user interface. Indeed, the task synthesis system introduces a system for generating a limited index of synthesized tasks that provides a concise listing of digital content unlike that provided by existing systems. Rather than navigating through multiple screens and parsing through multiple applications, minimal steps are needed to access the required data. The task synthesis system makes complex electronic applications more accessible by displaying an intuitive, user-friendly interface with familiar icons for navigating between the consolidated third-party content.

As illustrated by the foregoing discussion, the present disclosure utilizes a variety of terms to describe features and benefits of the task synthesis system. Additional detail is now provided regarding the meaning of these terms. For example, as used herein the term "third-party application," "third-party data source," or simply "third-party source" refers to a digital source that is separate from the task synthesis system. Examples of third-party sources include third-party websites, client applications, email systems, messaging systems, calendaring systems, content management systems, data management systems, web applications, digital media management systems, social networking applications, video conferencing systems, electronic messaging systems, or any other type of source or content.

As used herein, the term "third-party content," "third-party data," "third-party content item," "third-party application data" or simply "content item" refers to data associated with a third-party data source. Examples of content items include web pages, emails, other electronic messages, calendar events, digital content such as photos, videos, documents, files, folders, and other digital multimedia, and other digital data associated with a particular third-party source.

As used herein, the term "synthesized task" or simply "task" refers to a grouping of contextually related content from third-party data sources. In particular, the term synthesized task can include digital content from content items from various third-party data sources that is collected by the task synthesis system and associated together for presentation to the user as a consolidated grouping. For example, the task synthesis system may determine a relationship between the third-party content item of an email message, an instant message, and a calendar item, and consolidate these third-party content items into a single synthesized task for presentation to the user in the task synthesis inbox.

As used herein, the term "subtask" refers to a task or event associated with a synthesized task. In particular, a subtask can be a task that is related to accomplishing a synthesized task. For example, based on analyzing a synthesized task with content items related to an upcoming meeting, the task synthesis system may suggest a subtask of sending a reminder email to the expected attendees that contains the meeting agenda.

As used herein, the term "synthesized task inbox" refers to a graphical user interface that displays synthesized tasks. As mentioned above, in one or more embodiments the synthesized task inbox can display prioritized synthesized tasks to provide a cohesive task management interface that can help minimize distractions by consolidating a variety of third-party content into a single graphical user interface. For example, the synthesized task inbox can display synthesized tasks and provide various task management options (e.g., a prioritization option).

As used herein, the term "tag" refers to metadata associated with a synthesized task. In some embodiments a tag can be displayed as a graphical element in combination with a synthesized task in the task inbox. As described herein, tags can include category tags, content tags, or source tags. A category tag includes information related to a type of task. This information can include a task type (e.g., a meeting, a to-do) or a task category (e.g., a project name, a keyword). Tags can further include content tags that reference content items (e.g., documents, messages, emails, calendar events, user identifications, websites) associated with a synthesized task. The task synthesis system can make content tags selectable to allow a user to easily access a content item associated with a synthesized task. Moreover, tags can include source tags that indicate a third-party data source or sources on which the synthesized task is based. Accordingly, source tags can indicate a third-party data source or a third-party application. In some embodiments, source tags are selectable to allow a user to quickly access a third-party data source upon interacting with a source tag.

As used herein, the "degree of relationship" or "relationship" refers to a measure of the correlation between different content items. In particular, a degree of relationship captures how significantly content items are related to each other. For example, an email discussing an upcoming meeting and a Dropbox file containing a meeting agenda could have a higher degree of relationship than an email discussing an upcoming meeting and a Dropbox pdf file containing unrelated data.

As used herein, the "priority score" refers to the relative importance of a synthesized task. In some embodiments, a priority score can include a value representing a priority, importance, or significance of a synthesized task relative to other synthesized tasks. As an example, a synthesized task with a higher priority score can be emphasized (e.g., displayed first, larger, darker, brighter, flashing, or audible) within a task synthesis inbox to allow the user to focus on the more important or urgent tasks (i.e., prioritized tasks).

As used herein, the "time period" refers to the length of time during which an activity occurs. In particular, a time period can include a period of time that activities related to a synthesized task occur. For example, a time period can be the amount of time in minutes that it takes a user to complete the activities associated with a synthesized task. As another example, a time period can be a length of time that a task synthesis system analyzes the productivity of a user related to the interaction with or completion of a synthesized task.

As used herein, the term "prioritization option" refers to an option to efficiently identify the synthesized tasks that need earlier attention and the synthesized tasks that can be postponed. In particular, the prioritization option can be an option to prioritize synthesized tasks within a task synthesis inbox in relation to other synthesized tasks. For example, the task synthesis system can provide selectable prioritization options that allows the user to easily and efficiently select the priority level of the synthesized task to specify whether the synthesized task should be prioritized to be completed on the current day or can be postponed for at least another day.

As used herein, the term "ternary structure" refers to a group of options limited to three options. In particular, the task synthesis system can provide a ternary structure within a prioritization interface to efficiently receive user input that specifies whether a synthesized task should be prioritized or not. For example, the task synthesis inbox can provide a prioritization option that functions by accepting a single input to determine whether a synthesized task needs to be completed today, whether the synthesized task can be postponed and completed on another day, or whether the synthesized task can be deleted or ignored indefinitely. In some embodiments, the task synthesis system can provide a "binary structure" of prioritization options that include a "prioritize" option and a "deprioritize" option, or the equivalent.

As used herein, a "task statistic" refers to generated statistical information that is based on user activity related to a synthesized task. For example, a task statistic can indicate a value of duration, quality, breadth, consistency, volume, or time of user activity associated with a synthesized task. Additionally, a task statistic could indicate the number of synthesized tasks that were completed by the user, an amount of time the user spent on one or more of the synthesized tasks, a time of day when the user interacted with one or more of the synthesized tasks, a day of the week when the user interacted with a synthesized task, or a volume of synthesized tasks with which the user addressed based on monitoring user activity related to the synthesized tasks.

Additional detail regarding the task synthesis system will now be provided with reference to the figures. For example, FIG. 1 illustrates a schematic diagram of an exemplary system environment ("environment") 100 in which a task synthesis system 102 can be implemented. An overview of the task synthesis system 102 is described in relation to FIG.

1. Thereafter, a more detailed description of the components and the processes of the task synthesis system 102 is provided in relation to the subsequent figures.

As shown, the environment includes server(s) 104, a client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 and or the third-party server(s) 114 via the network 112. For example, the client device 108 can receive user input from respective users interacting with the client device 108 (e.g., via the task synthesis client application 110) to, for instance, access, generate, modify, add, delete, or share content or to select a user interface element such as a task prioritization option. In addition, the task synthesis system 102 on the server(s) 104 can receive information relating to various interactions with content and/or user interface elements based on the input received by the client device 108 (e.g., to access content, modify tasks, or perform some other action).

As shown, the client device 108 can include a task synthesis client application 110. In particular, the task synthesis client application 110 may be a native application installed on the client device 108 (e.g., a mobile application, a desktop application, etc.), or a cloud-based or web application where all or part of the functionality is performed by the server(s) 104. Based on instructions from the task synthesis client application 110, the client device 108 can present or display information, including a user interface such as a task synthesis inbox that includes depictions of synthesized tasks in a collection or grouping, along with filtering and modification options.

As illustrated in FIG. 1, the example environment also includes the server(s) 104. The server(s) 104 may generate, track, store, process, receive, and transmit electronic data, such as digital content items, interactions with digital content items, and/or interactions between user accounts or client devices. For example, the server(s) 104 may receive data from the client device 108 in the form of a request to generate a synthesized task or to generate a synthesized task inbox for display on the client device 108. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning servers, and other types of servers.

As shown in FIG. 1, the server(s) 104 can also include the task synthesis system 102 as part of a content management system 106. The content management system 106 can communicate with the client device 108 to perform various functions associated with the task synthesis client application 110 such as managing user accounts, managing content collection, managing content items, managing synthesized tasks, and facilitating user interaction with the synthesized tasks and/or content items. The content management system 106 can communicate with the third-party server(s) 114 to perform various functions associated with the task synthesis system 102 such as identifying and collecting third-party data for the synthesized tasks. Indeed, the content management system 106 can include a network-based cloud storage system to manage, store, and maintain content items and related data across numerous user accounts.

As shown in FIG. 1, the third-party server(s) 114 can include third-party data sources 116. In some embodiments, the task synthesis system 102 and/or the content management system 106 access the third-party server(s) 114 to access and obtain information from third-party data sources 116 such as digital content items, content attributes, and other information. As further shown, the client device 108 can contain third-party applications 118. In some embodiments, the task synthesis system 102 and/or the content management system 106 access the client device 108 to access and obtain information from third-party data applications 118 such as digital content items, content attributes, and other information.

Although FIG. 1 depicts the task synthesis system 102 located on the server(s) 104, in some implementations, the task synthesis system 102 may be implemented by (e.g., located entirely or in part) on one or more components of the environment. For example, the task synthesis system 102 may be implemented by the client device 108, and/or a third-party device. For example, the client device 108 can download all or part of the task synthesis system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the task synthesis system 102, bypassing the network 112. As another example, the environment may include multiple client devices, each associated with a different user account for managing digital content items.

Figure 2:
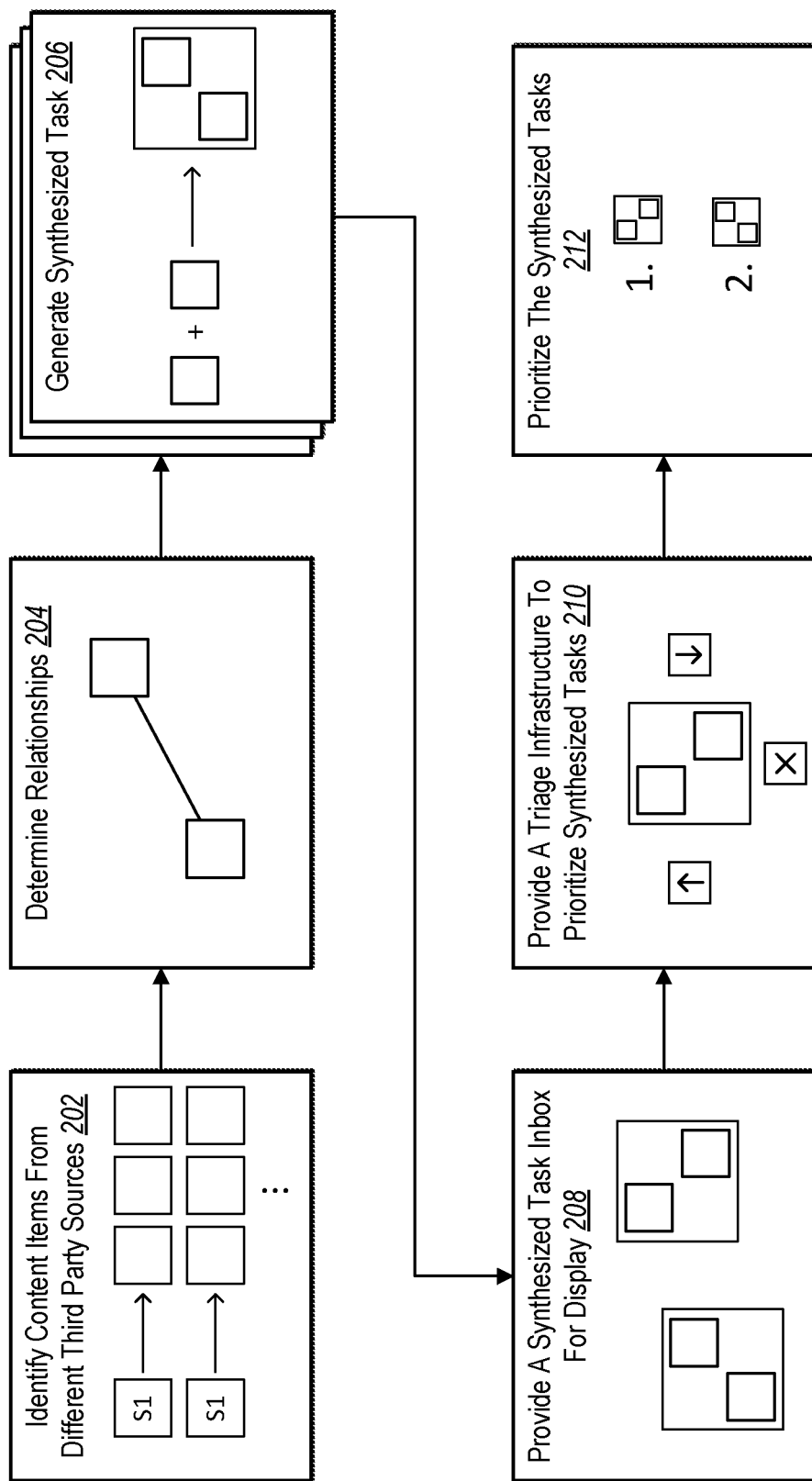
FIG. 2 illustrates an example of a task synthesis system in accordance with one or more embodiments.

As mentioned above, the task synthesis system 102 can intelligently identify and organize third-party content items associated with a user account into synthesized tasks. In particular, the task synthesis system 102 can generate multiple synthesized tasks and further prioritize or arrange the synthesized tasks for presentation to the client device 108 in a synthesized task inbox. FIG. 2 illustrates an overview of identifying, generating, and prioritizing synthesized tasks in accordance with one or more embodiments. Additional detail regarding the various acts of FIG. 2 is provided thereafter with reference to subsequent figures.

As illustrated in FIG. 2, the task synthesis system 102 performs an act 202 to identify content items from different third-party sources. For example, the task synthesis system 102 identifies content associated with a user account of the content management system 106. For instance, the task synthesis system 102 identifies or determines content items that can include digital images, digital documents, social networking data, calendar data, webpages, digital messages, phone application data, and/or content items of other types. In some embodiments, the task synthesis system 102 identifies content that includes digital content stored in one or more network locations associated with the content management system 106 (and tied to a common user account).

As further illustrated in FIG. 2, the task synthesis system 102 performs an act 204 to determine relationships between content items. In particular, the task synthesis system 102 determines one or more relationships between third-party content items (as identified via the act 202) based on the attributes of the content items. For example, the task synthesis system 102 determines content attributes such as objects, keywords, key phrases, topics, event type, user identification, time, color, priority, or other visual or non-visual attributes of the content items. As another example, the task synthesis system 102 determines relevance attributes such as interactions by a user account with the third-party content items including shares, modifications, comments, and accesses. In some cases, the task synthesis system 102 utilizes one or more content attribute machine learning models to generate or determine content attributes for content items within the content collection. Additional detail regarding determining content attributes is provided below with reference to subsequent figures.

The task synthesis system 102 further identifies content associated with a user account from third-party data source(s) 116. To elaborate, the task synthesis system 102 determines a measure of relationship by identifying content attributes that are more or less common within the third-party data source(s) 116. For instance, in one or more embodiments, the task synthesis system 102 uses a natural language processing model to generate relationship tags (e.g., keywords, key phrases, user identifications, times, dates, event types, priorities) and associate the tags with third-party data. Indeed, the task synthesis system can generate synthesized tasks based on tags shared by multiple third-party content items. Additional detail regarding generating relationship tags is provided below with reference to subsequent figures.

Alternatively, the task synthesis system 102 may use machine learning to generate content item features (e.g., keywords, key phrases, user identifications, times, dates, event types, priorities) related to the third-party content items. The machine learning model classifies the third-party content items and can predict relationships between the third-party content items based on the classification of the third-party content items. Additional detail regarding using the machine learning model is provided below with reference to subsequent figures.

Additionally, the task synthesis system 102 performs the act 206 to generate the synthesized task. In particular, the task synthesis system 102 generates the synthesized task based on the relationships determined in act 204. In these or other embodiments, the task synthesis system 102 generates a synthesized task by filtering the identified content items and removing content items that do not satisfy the filtering criterion; thereby selecting third-party content items that satisfy a threshold measure of the relationship with each other. Additionally, in one or more embodiments, the task synthesis system 102 filters the content items based on content items satisfying a threshold relevancy, considering: recency, collaborators, type, urgency, repetition, source, keywords, key phrases, event, priority, or user interaction.

As further illustrated in FIG. 2, in some embodiments, the task synthesis system 102 performs an act 208 to provide a synthesized task inbox for display on the client device. As shown, the task synthesis system 102 can provide synthesized tasks for display within a synthesized task inbox (e.g., with higher ranked relationships appearing first in the display). More particularly, the task synthesis system 102 generates and provides options to view, generate, update, modify, filter, remove, evaluate, or prioritize (or otherwise interact with) synthesized tasks within a synthesized task inbox displayed on the client device.

As further shown, the task synthesis system 102 can perform an act 210 to provide a prioritization infrastructure to prioritize synthesized tasks. For example, the act 210 may consist of a ternary option to prioritize the synthesized task or deprioritize the synthesized task. Alternatively, although not shown, the task synthesis system 102 can provide an infrastructure to prioritize synthesized tasks in with additional peculiarity.

As further illustrated in FIG. 2, the task synthesis system 102 performs an act 212 to prioritize the synthesized tasks. In particular, the task synthesis system 102 can prioritize the synthesized tasks according to relevance in relation to the user account or according to the respective content attributes within the plurality of content items. In certain cases, the task synthesis system 102 also (or alternatively) ranks third-party content according to relevance and/or prominence using a rule-based heuristic. In some embodiments, the task synthesis system 102 also provides a prioritization option for display within the task synthesis inbox. Based on user interaction selecting the prioritization option, the task synthesis system 102 prioritizes the synthesized tasks for presentation within the task synthetization inbox. The task synthesis system 102 can also refine or update the priority of synthesized tasks based on filter options and/or additional dynamic prioritization methods (e.g., by excluding content items that do not satisfy filtering criteria and/or do not correspond to a specific relationship). Additional detail regarding prioritizing the synthesized tasks is provided below with reference to subsequent figures.

Figure 3:
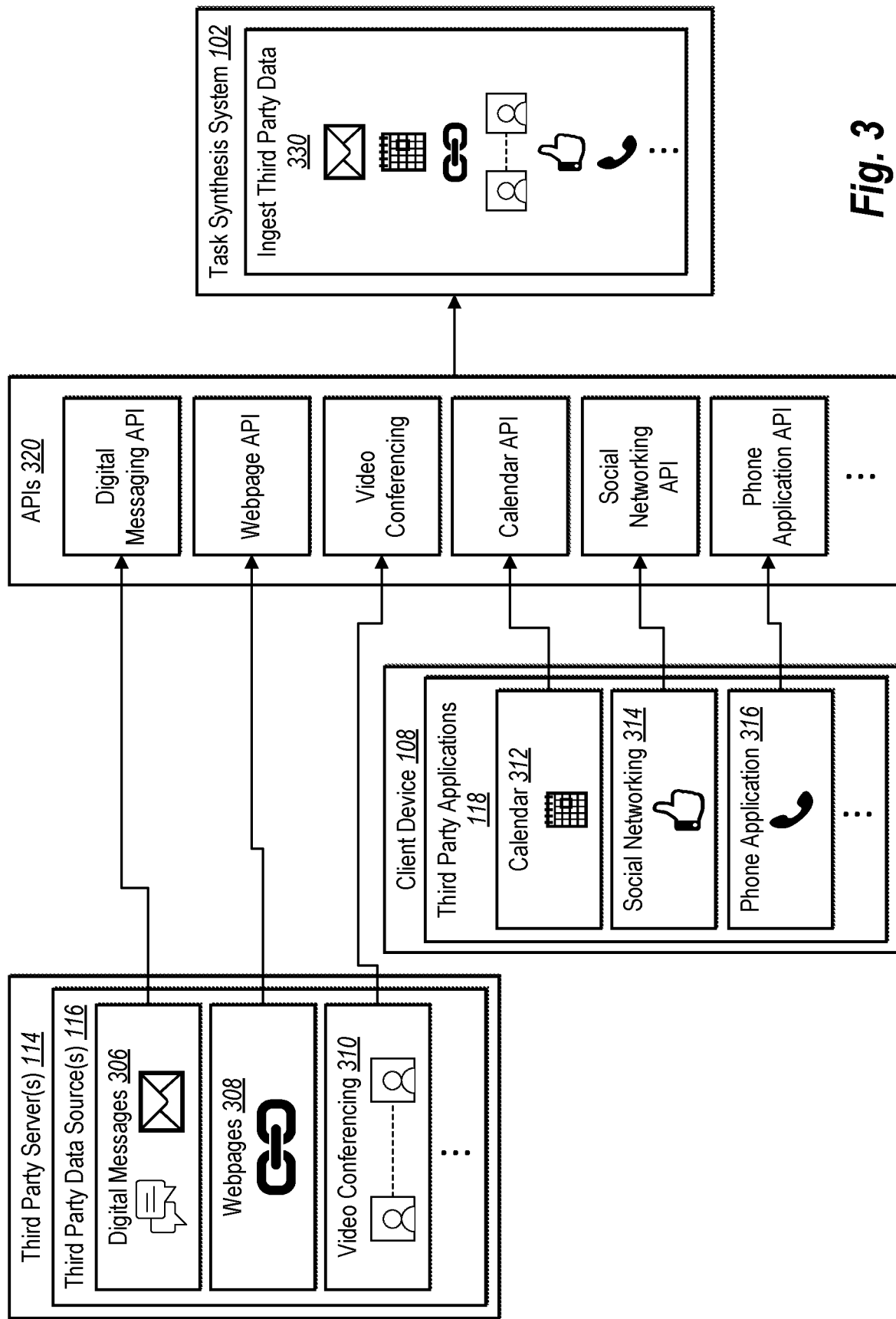
FIG. 3 illustrates a flow diagram illustrating identifying content items from different third-party sources in accordance with one or more embodiments.

As mentioned above, the task synthesis system 102 identifies and collects third-party content from different third-party sources to create synthesized tasks. FIG. 3 illustrates an example of collecting third-party content from a plurality of sources using APIs (application programming interfaces). In particular, a specific API can be used to interface with each of the third-party data source(s) 116 residing on the third-party server(s) 114 as shown. Additionally, an application specific API can be used to interface with each of the third-party application(s) 118 residing on the client device 108 as shown. As discussed above (although all options are not shown in FIG. 3), in one or more embodiments the third-party data source(s) 116 and the third-party application(s) 118 can reside on one or more of the third-party server(s) 114, the client device 108, or the server(s) 104. The following paragraphs describe each of these sources and content from these sources.

As illustrated in FIG. 3, examples of third-party data source(s) include the digital messaging source 306. Generally, the digital messaging source 306 can comprise any sort of digital messaging system. In particular, the digital messaging source 306 can include digital messaging systems that transmit digital messages from one user to another across a network. For example, the digital messaging source 306 can include an email system, an instant messaging system, a text messaging system, or other types of messaging systems.

Generally, the digital messaging source 306 stores and manages communication information including digital messages. In particular, the digital messages include data transmitted from one user to another user within the digital messaging source 306. For example, the digital messages can include emails, instant messages, text messages, and others comprising text data, image data, audio data, video data, and other types of media files. The task synthesis system 102 can determine to include links to individual digital messages, attachments, and/or conversations comprising a series of digital messages. Additionally, the digital messages also includes links to other web-accessible sources that have been sent via the digital messaging source 306.

As further illustrated in FIG. 3, another example of a third-party source includes the digital web source 308. Generally, the digital web source 308 comprises any type of web storage and management system. In particular, the digital web source 308 includes a web server or servers that stores web server software and component files for a website. For example, the digital web source 308 can comprise one or more web servers that store, process, and deliver websites, web pages, web documents, and/or web applications to client devices. The task synthesis system 102 can access web pages from the digital web source 308. In particular, the task synthesis system 102 can determine to include links to individual web pages, and/or excerpts of digital web pages within the synthesized tasks. For instance, the web pages can include web pages that a user has visited through a web browser and/or via the task synthesis system 102.

As further illustrated in FIG. 3, the third-party data source(s) 116 can also include the video conferencing source 310. Generally, the video conferencing source comprises systems that provide a visual connection between two or more parties and simulates a face-to-face meeting. In particular, the video conferencing source 310 can include systems that facilitate the storage, management, delivery, and or editing of video conferencing conversations, meetings, videos, or calls.

As illustrated in FIG. 3, examples of third-party data applications(s) include the calendar source 312. Generally, the calendar source 312 includes any sort of calendar management system. In particular, the calendar source 312 can comprise a calendar system that allows one or more users to edit and optionally share access to an online calendar. For instance, the calendar source 312 can comprise a web application that generates, stores, manages, and associates calendars with one or more users. The task synthesis system 102 can access calendar items from the calendar source 312 and add links to the calendar items to the synthesized tasks. In particular, the calendar items comprise digital content items associated with an online calendar. For instance, the calendar items can include individual events, a group of events, or even entire calendars.

Third-party applications(s) may also include the social networking source 314. Generally, the social networking source 314 can comprise any sort of social networking system. In particular, the social networking source 314 can include social networking systems that transmit digital messages from one user to another across a network. For example, the social networking source 314 can include an instant messaging system, a blogging system, chat system, websites, recruitment system, news system, image sharing, or other types of messaging systems.

Generally, the social networking source 314 stores and manages communication information including social networking data. In particular, the digital networking data includes data transmitted from one user to another user within the social networking source 314. For example, the digital messages can include instant messages, text messages, blogs, chats, news items and others comprising text data, image data, audio data, video data, and other types of media files. The task synthesis system 102 can determine to include links to individual digital messages, attachments, and/or conversations. Additionally, the social networking source 314 includes links to other web-accessible sources that have been sent via the social networking source 314.

As illustrated in FIG. 3, examples of third-party data applications(s) include the phone application source 316. Generally, the phone application source 316 includes any sort of phone management system. In particular, the phone application source 316 can comprise a system that allows one or more users to access to phone applications and data collected from calls made over the internet. For instance, the phone application source 316 can comprise a web application that generates, stores, manages, and associates phone call data with one or more users. For example, the phone application source 316 can comprise digital content items associated with a VoIP (voice over IP system).

Although FIG. 3 illustrates some examples of third-party data source and third-party applications, the task synthesis system 102 can access other third-party sources and applications not illustrated (e.g., Dropbox, content management systems, photo repositories). In particular, third-party sources and applications can comprise any type of third-party system that manages and provides content as described herein.

As illustrated in FIG. 3, the task synthesis system 102 utilizes API(s) 320 to identify related content from the third-party data source(s) 116 and third-party application(s) 118. The API(s) 320 can identify and present third-party data to the task synthesis system 102 based on user-defined rules and/or based on characteristics of the content items. As further illustrated in FIG. 3 the task synthesis system 102 can ingest third-party data 330 from the digital messaging source, digital web source, video conferencing source, calendar source, social networking source, phone application source, calendar source, social networking source, or phone application source, and other associated sources into content within the task synthesis system 102.

Figure 4A:
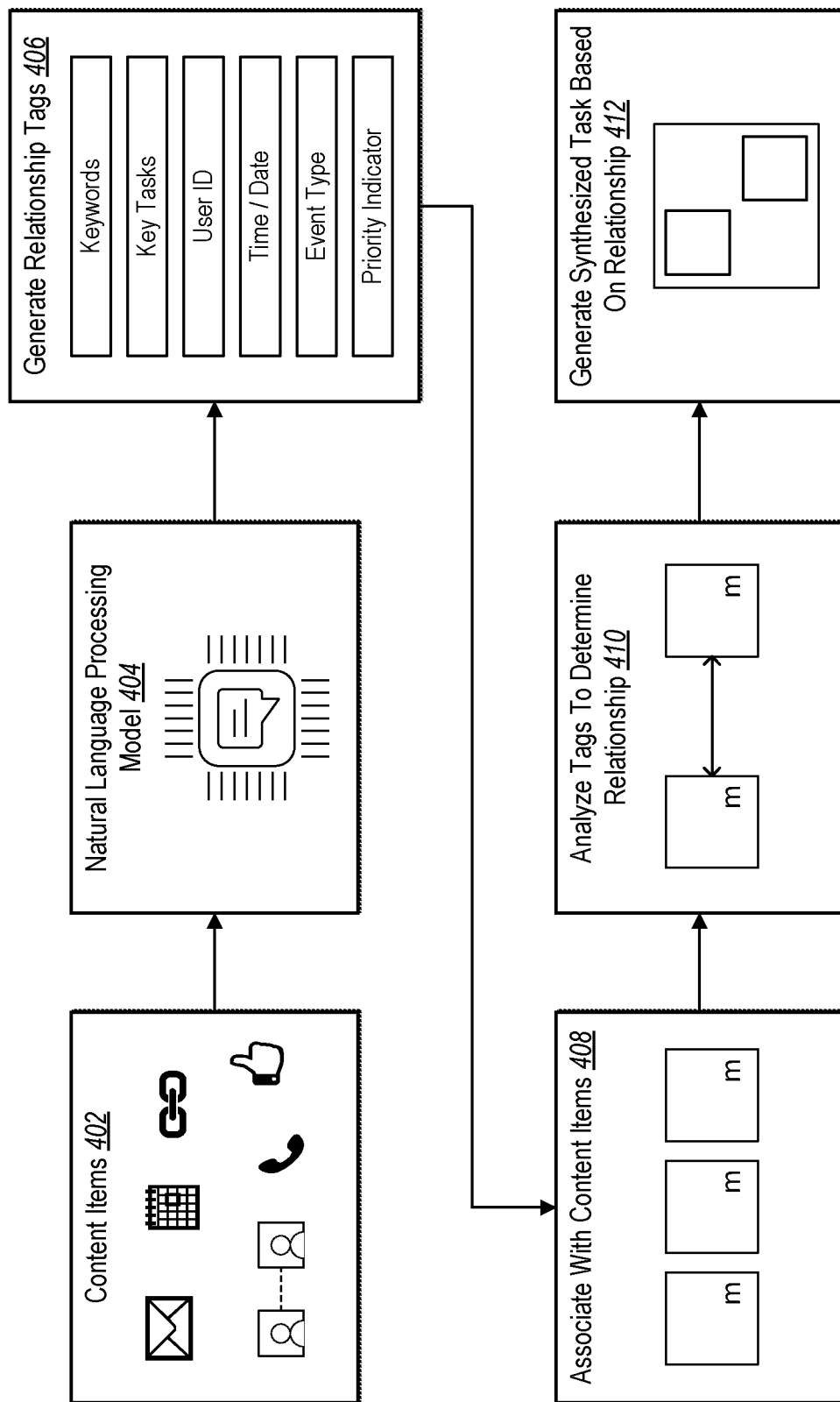
FIG. 4A illustrates a flow diagram showing an example of determining relationships using natural language processing according to one or more embodiments.

As illustrated in FIG. 4A, in some cases the task synthesis system 102 utilizes natural language processing to determine relationships among content items by identifying relationships that are within a threshold similarity. In particular, the task synthesis system 102 takes the content items 402 (ingested as shown in FIG. 3) and determines relationships using a natural language processing model 404. For example, the natural processing model can use coreference resolution, discourse analysis, morphological segmentation, named entity recognition, natural language generation, part-of-speech tagging, optical character recognition, parsing, relationship extraction, speech recognition, speech segmentation, or other known methods of natural language processing to process the content items 402.

As further illustrated in FIG. 4A, in some cases the natural language processing includes generating relationship tags 406 using keywords, key phrases, user identification, time, date (e.g., current, due date, critical date), event type, priority indicators, and other tags to determine relationships among the content items.

Upon generating relationship tags, the task synthesis system 102 associates relationship tags with content items 408. For instance, the task synthesis system 102 can identify key phrases within content items that are within a threshold similarity. For instance, the task synthesis system 102 identifies exact matches of the word "organize" or its variants (e.g., "organization," "organizes," "organizing," etc.) as well as other phrases that, according to natural language processing, have meanings within a threshold similarity (e.g., "arrange," "neatly place," etc.).

As further illustrated in FIG. 4A, the task synthesis system 102 performs the act 410 to analyze relationship tags and determine relationships between content items. For example, in some embodiments the task synthesis system 102 determines mentions by comparing depicted objects within content items (e.g., images or videos) with a tag attribute (e.g., key phrase or image) to identify similar objects or image themes using object similarity analysis or image comparison analysis.

Furthermore, the task synthesis system 102 can generate synthesized tasks based on relationship 412 as shown in FIG. 4A. For example, based on determining a relationship between an upcoming project, an agenda of a project meeting, and an email string proposing times for a project meeting, the task synthesis system 102 can generate a synthesized task based on the relationship. Additional detail regarding generating a synthesized task based on relationship is provided below with reference to subsequent figures.

Figure 4B:
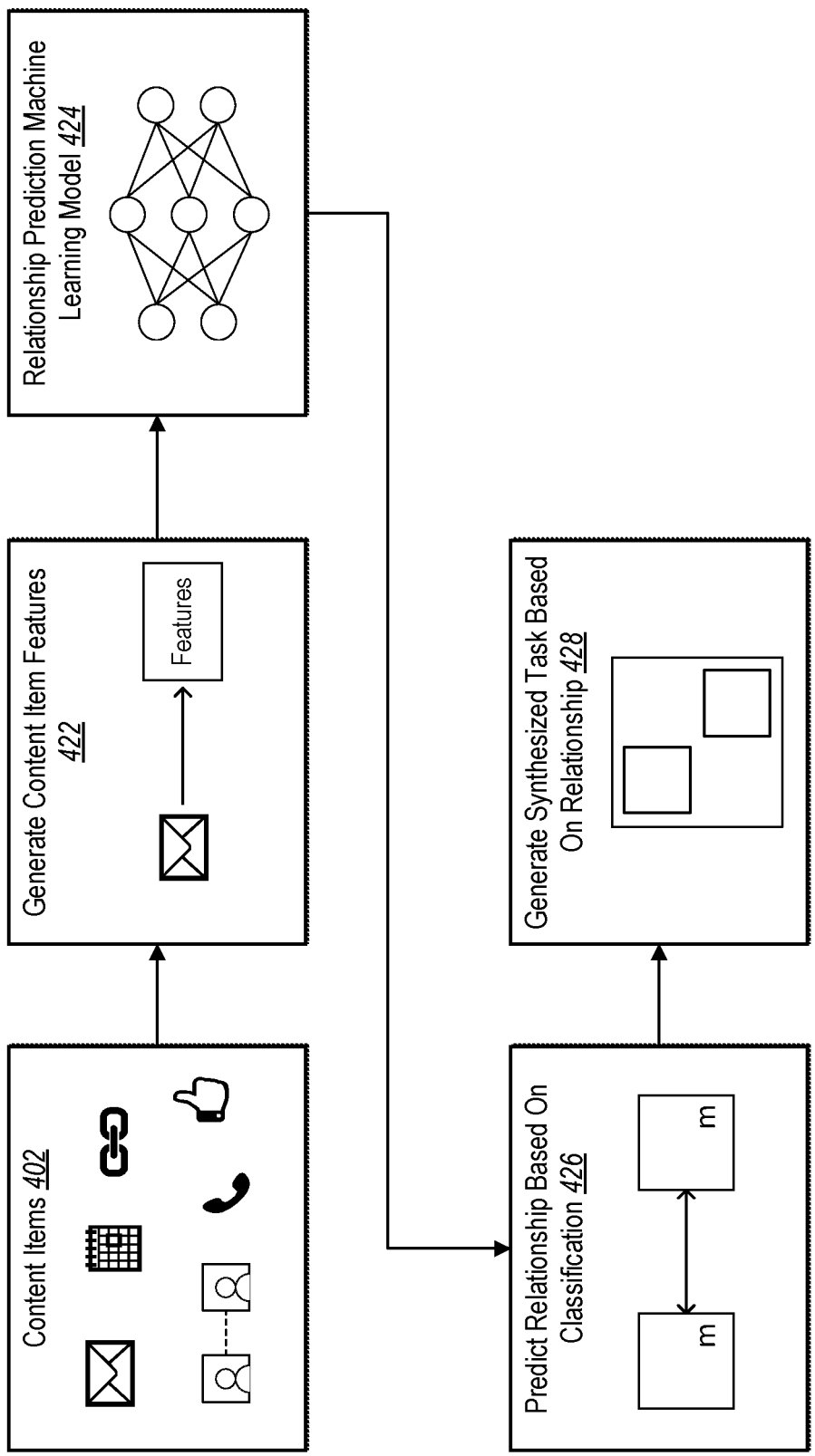
FIG. 4B illustrates a flow diagram showing an example of determining relationships using a machine learning model according to one or more embodiments.

As mentioned above, in certain described embodiments, the task synthesis system 102 generates synthesized tasks by determining relationships between one or more third-party content items. FIG. 4B illustrates an example sequence diagram for predicting relationships for synthesized tasks based on a machine learning model implementing feature classification. As Illustrated in FIG. 4B, the task synthesis system 102 identifies a plurality of content items 402 (ingested in act 330) from third-party data source(s) 116. As shown, the task synthesis system 102 further performs the act 422 to generate content item features associated with the content items 402. For instance, the task synthesis system 102 can determine descriptive and relevance attributes (e.g., relative to a user account) to use as features for each of the content items from the third-party data source(s) 116.

To elaborate, as illustrated in FIG. 4B, the task synthesis system 102 utilizes a relationship prediction machine learning model 424 to extract, determine, or predict a content classification for a digital content item. For example, the task synthesis system 102 utilizes the relationship prediction machine learning model 424 trained on sample content items and corresponding indications of ground truth content attributes associated with the sample content items. In some cases, the task synthesis system 102 utilizes the relationship prediction machine learning model 424 to perform the act 426 to predict the relationship based on the classification according to its learned parameters such as internal weights and biases. The classification can reflect a word, phrase, object, image, sound, timestamp, priority, type, or user identification associated with a content item.

As further illustrated in FIG. 4B, the task synthesis system 102 predicts a relationship based on classification. For example, the task synthesis system 102 utilizes the classifications provided by the relationship prediction machine learning model 424 to determine a measure of the relationship between the content items 402. For instance, the task synthesis system 102 determines a number of instances that the individual classifications occur within the content items 402.

The task synthesis system can also (or alternatively) determine a measure of relevance for a classification in relation to a user account (e.g., based on historical user account activity with content items reflecting the classification). In some cases, the task synthesis system 102 further ranks the classifications according to relevance and/or prominence. The task synthesis system 102 thus generates synthesized task 428 from the classifications with at least a threshold measure of prominence and/or a threshold measure of relevance (discarding other classifications). The task synthesis system 102 can also determine classifications for discrete portions of content items as well. In particular, the task synthesis system 102 can utilize a relationship prediction machine learning model 424 to generate or predict a classification for a content portion, where the model is trained to not only identify the content classification but also to determine a location of the content classification within the content item. In cases where a content item includes multiple mentions of a classification, the relationship prediction machine learning model 424 can further train and utilize the machine learning model to identify the various portions reflecting the content attribute, where the portions are mutually exclusive and do not overlap one another.

As further illustrated, the task synthesis system 102 can generate a synthesized task 428 using the classification to group content items. In particular, the task synthesis system 102 can generate a synthesized task by selecting content items that reflect or otherwise correspond to a particular classification.

Figure 5:
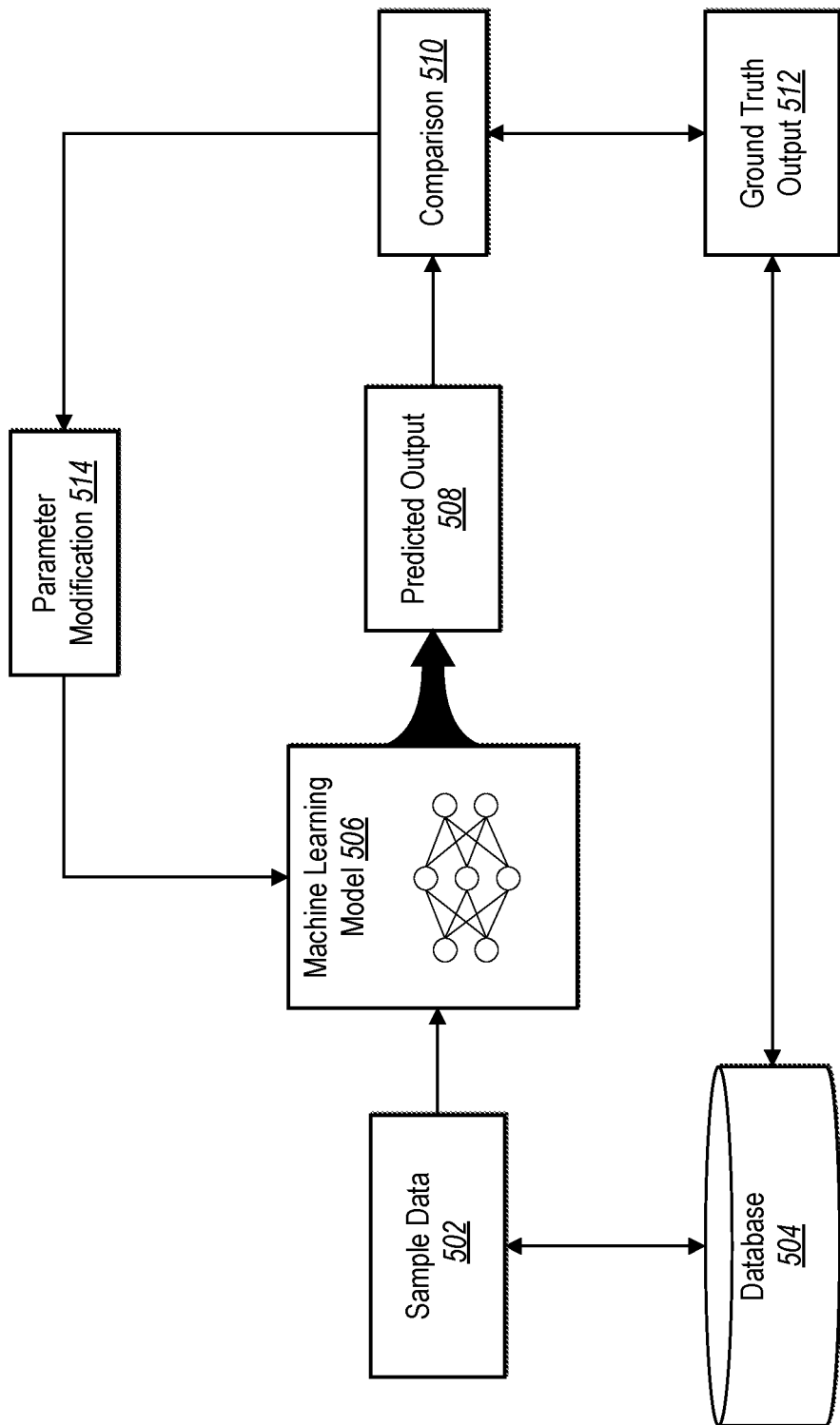
FIG. 5 illustrates an example sequence diagram for training a task synthesis learning model to generate predicted task synthesis models in accordance with one or more embodiments.

In certain described embodiments, the task synthesis system 102 utilizes a machine learning model to provide synthesized tasks as described in relation to FIG. 4B. In particular, FIG. 5 illustrates an example sequence diagram for training a machine learning model (e.g., a relationship prediction learning mode) in accordance with one or more embodiments. In some cases, the task synthesis system 102 trains the machine learning model 506 such as a neural network to have internal parameters such as weight and biases for generating a predicted output 508 (e.g., a predicted classification) based on training data.

As shown, the task synthesis system 102 access sample data 502 from a database 504. For example, the task synthesis system 102 determines sample data 502 such as sample content items, sample content attributes, or some other sample data to input into the machine learning model 506. In some embodiments, the task synthesis system 102 utilizes the machine learning model 506 to generate a predicted output 508 from the sample data 502. Specifically, the machine learning model 506 generates a predicted output 508 according to its internal parameters.

As part of training the machine learning model 506, the task synthesis system 102 performs a comparison 510. Specifically, the task synthesis system 102 compares the predicted output 508 with a ground truth output 512 (e.g., a ground truth content attribute to compare with a predicted content attribute). Indeed, the task synthesis system 102 accesses the ground truth output 512 from the database 504, where the ground truth output 512 is designated as corresponding to the sample data 502. In some cases, the task synthesis system 102 performs the comparison 510 using a loss function such as a mean squared error loss function or a cross entropy loss function to determine an error or a measure of loss associated with the machine learning model 506 (or between the predicted output 508 and the ground truth output 512).

In one or more embodiments, the task synthesis system 102 further performs a parameter modification 514. Based on the comparison 510, the task synthesis system 102 modifies parameters of the machine learning model 506. For example, the task synthesis system 102 modifies parameters of the machine learning model 506 to reduce a measure of error or a loss associated with the machine learning model 506. The task synthesis system 102 can further repeat the process illustrated in FIG. 5 for many iterations or epochs until the machine learning model 506 satisfies a threshold measure of loss. For each iteration, the task synthesis system 102 generates new predictions from new sample data, performs a comparison, and modifies parameters (e.g., via back propagation) to improve predictions for subsequent iterations.

As mentioned above and illustrated in FIG. 6, the task synthesis system 102 can generate synthesized tasks. The task synthesis system can use content item 602 features to determine related content items to include in the synthesized task. In particular, the task synthesis system 102 can use the relationship factor filter 604 to group content items 602 into the synthesized task according to respective filtering categories. For example, the task synthesis system 102 may refine the synthesized task by filtering the identified content items 602 and removing content items that do not satisfy the filtering criterion; thereby selecting third-party content items that satisfy a threshold measure of the relationship with each other. For example, the task synthesis system can generate and utilize relationship factors to filter content items based on content attributes (or features, or classifications). In some cases, the task synthesis system 102 uses one or more machine learning models to determine or predict relationship factors for content items. As shown, the task synthesis system 102 can group or exclude content items based on the relationship factor filter 604.

For example, the task synthesis system 102 may utilize keywords for text identified within the content to identify related information from third-party sources. For instance, the task synthesis system 102 may automatically identify a keyword within third-party content by determining that the keyword occurs in the content at least a threshold number of times. In other embodiments, the task synthesis system 102 can analyze metadata within the content to determine common themes or keywords. Based on determining that information from a new third-party data source includes the identified keywords (and/or related words), the task synthesis system can determine that the information is related to the synthesized task.

Figure 6:
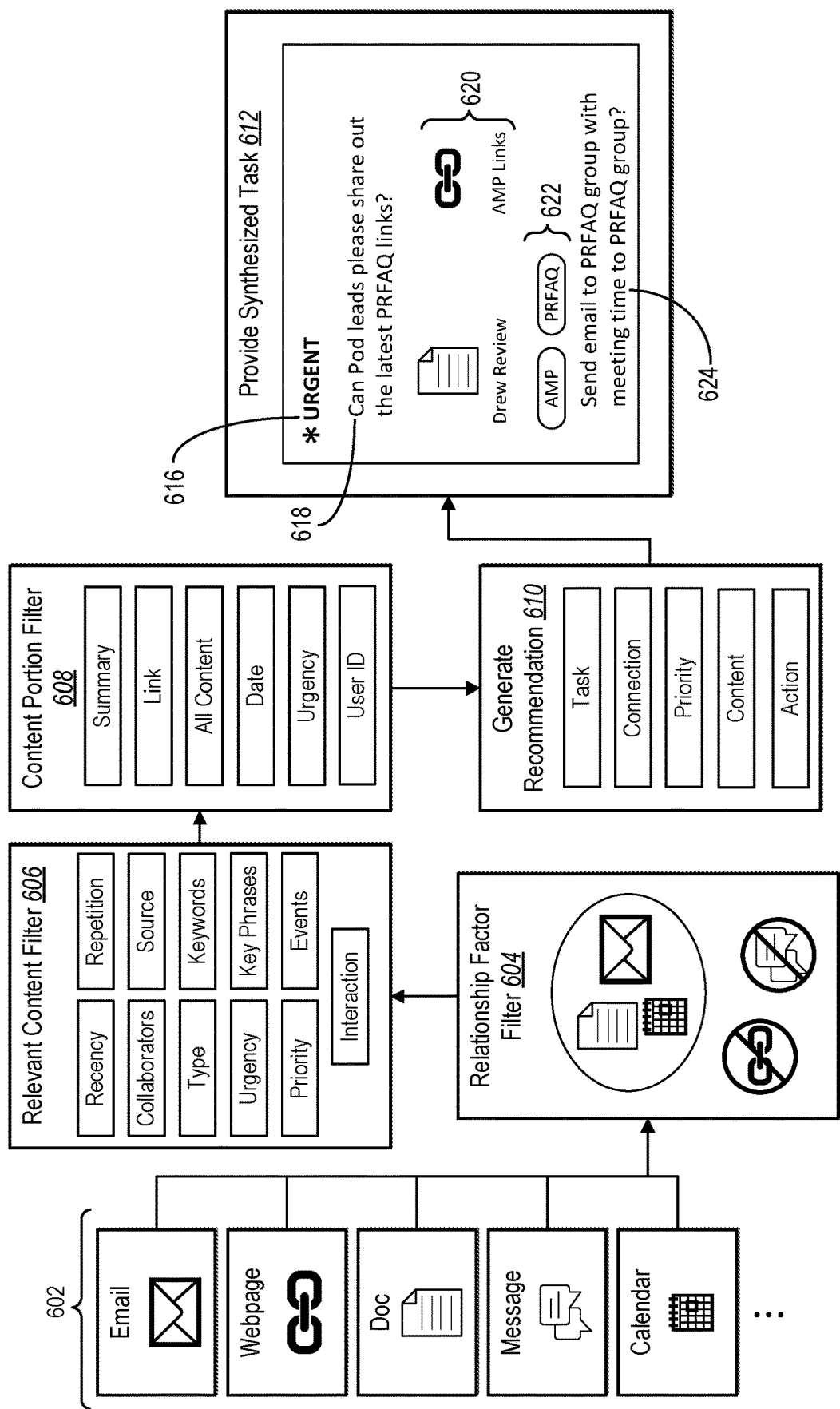
FIG. 6 illustrates a flow diagram showing an example of generating a synthesized task from different content items in accordance with one or more embodiments.

As further illustrated in FIG. 6, the task synthesis system 102 can utilize a relevant content filter 606 to analyze content that is not only related but is also relevant to a user. In one or more embodiments, the task synthesis system 102 filters the content items based on content items satisfying a threshold relevancy, considering: recency, collaborators, type, urgency, repetition, source, keywords, key phrases, event, priority, or user interaction.

For example, the relevant content filter 606 may identify related content from third-party sources based on determining that the content of the third-party source is significantly related to the user. For example, the relevant content filter can determine that a user has accessed the content recently. Or the task synthesis system 102 can identify relevant information based on users associated with the content. Generally, the synthesis system 102 can identify users associated with a content by determining collaborating users that have access to the content and/or by identifying users that have sent or received information. Based on identifying related users or users associated with the content, the task synthesis system 102 can determine to include information from third-party sources based on an association with the related users. For instance, the synthesis system 102 can include content from a third-party source based on determining that a link to the content was sent by or sent to a collaborating user of the content. As another example, the task synthesis system 102 identifies a contact that is associated with an email that the user sent. The synthesis system 102 identifies content from third-party sources that is associated with the content—for instance, the synthesis system 102 can identify links to emails, instant messages, documents, links, or other content that the contact has sent to, received from, or collaborated with the user.

As further illustrated in FIG. 6, the task synthesis system 102 can include a content portion filter 608. The content amount filter selection a portion of the content based on the content's relationship. In particular, the content portion filter can be used to control the volume of data that will be directly presented to the user. In some embodiments, the content portion filter can determine a threshold amount of content to associate with a synthesized task. In some embodiments, the content portion filter can replace unwieldy content (e.g., large documents, complicated images, audio) with links to the source content. For example, the content portion filter can filter the content to include only part of a document or selections within a date range (or associated with a date range). Indeed, the content portion filter can provide a summary of content, a link to content, all related content, content in a date range, content within a certain priority, urgent content, or content associated with a user identification.

As illustrated in FIG. 6, the task synthesis system 102 can generate a recommendation 610 for content to be associated with the synthesized task. This recommendation can include content, tasks, connections, actions, and priority. For example, the recommendation can include a recommendation to associate an email about company restructuring plans, a memo to about hiring policies, interview notes about a job applicant, and today's calendar item for an applicant interview together as a high priority synthesized task. Indeed, the task synthesis system 102 can analyze the patterns and trends in the historical data to make predictions or recommendations for future tasks. For example, the recommendations can be generated based on historical data associated with productivity, priority, and/or actions assigned to similar synthesized tasks in the past. As another example, the task synthesis system 102 can prioritize the synthesized task by analyzing the impact level associated with completing the synthesized task, which includes a prediction of the expected difficulty of the synthesized task compared to the expected impact of completing the task.

As mentioned, the task synthesis system 102 can generate a recommendation 610 for an action to associate with the synthesized task. Indeed, the task synthesis system 102 can include a recommendation to perform an action creating an email about company restructuring plans, a memo to about hiring policies, interview notes about a job applicant, and a calendar item for an applicant interview. For example, the task synthesis system 102 can generate a recommendation for an action and intelligently compose an email, schedule a meeting, modify a file, or generate a calendar item (e.g., without further user interaction). As another example, the task synthesis system 102 can generate a recommendation for the action and require user confirmation before performing the suggested action associated with the synthesized task. As another example, the task synthesis system 102 can generate the action recommendation by performing the initial steps in a suggested action and then providing a prompt (e.g., suggestions 624) for user confirmation before completing the suggested action (e.g., provide content for the user to review, revise, and/or utilize). As further illustrated in FIG. 6, the task synthesis system 102 can then perform act 612 provide synthesized task 614 to the client device 108. As shown in FIG. 6, the synthesized task 614 can include various items (not limited to those listed). For example, the synthesized task can include a representation of priority 616 such as a label, color, emphasis, size, sound, or flashing. The synthesized task can include a brief summary element 618 that can be an excerpt from one of the associated content items or a synopsis generated by the task synthesis system 102. The synthesized task can include visual (or non-visual) representations of third-party content (elements 620) associated with the synthesized task. The synthesized task can include tags 622 representing categories associated with the synthesized task (e.g., applications, documents, user identifications, keywords, phrases, topics). The synthesized task can also include suggestions 624 for activities to perform based on the synthesized task (e.g., send email, create calendar items, call boss, attend meeting). In addition to adding content from third-party sources, the synthesized task may include links to facilitate access to related third-party sources. Additional detail about providing the synthesized task is provided below with reference to subsequent figures.

FIGS. 1-6 illustrate how the task synthesis system 102 identifies content items, determines relationships, generates synthesized tasks, and provides the synthesized tasks for display in a consolidated graphical user interface on a client device (e.g., the client device 108). As mentioned previously, the task synthesis system 102 can provide the synthesized tasks within a consolidated graphical user interface to enable a user to view related content (in the form of synthesized tasks) from various third-party sources. FIGS. 7 and 8A-8E and the description that follows illustrate various example embodiments of a task synthesis system graphical user interface and features in accordance with the features and functions described above.

Figure 7:
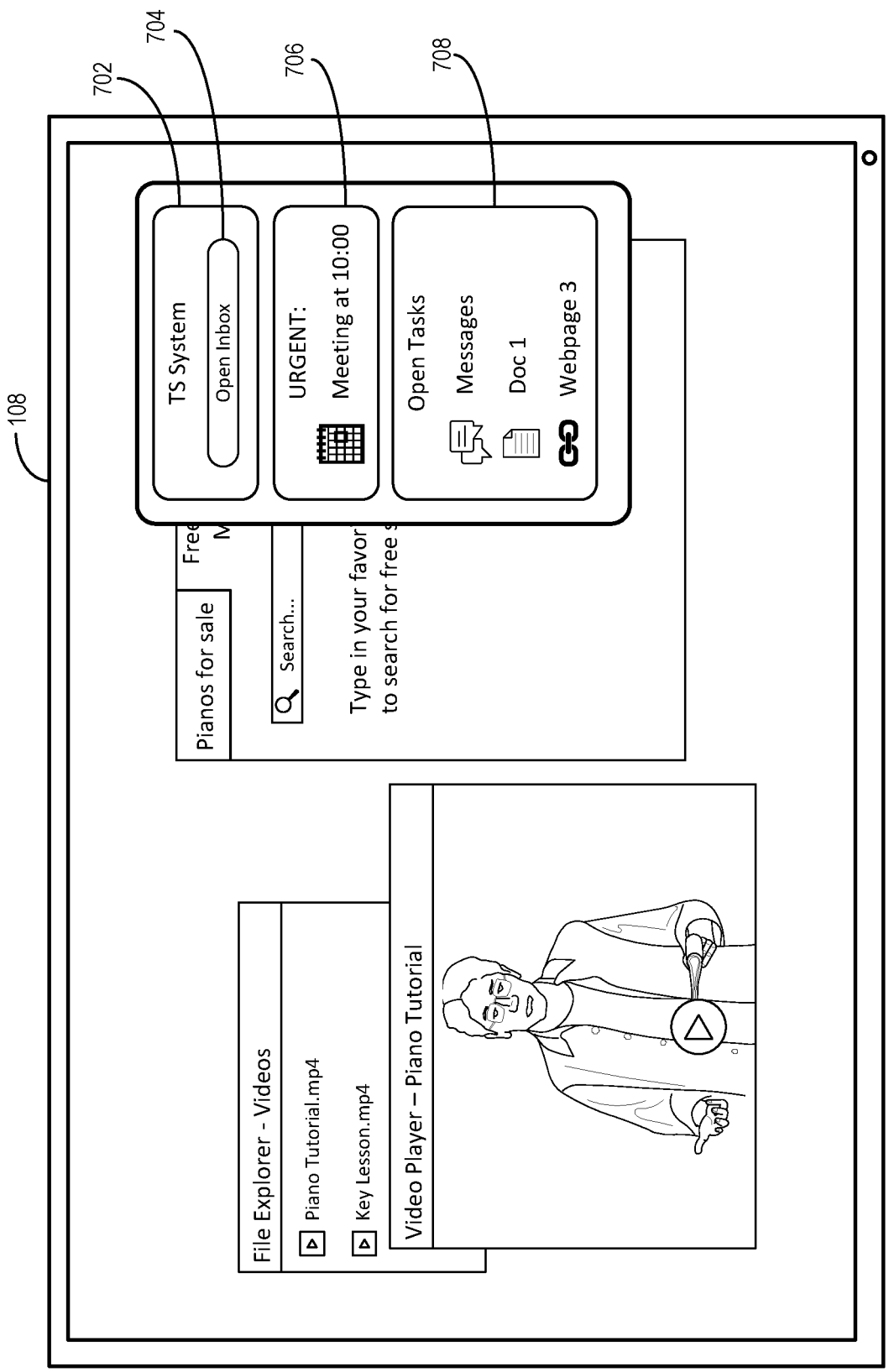
FIG. 7 illustrates an example task synthesis system graphical user interface in accordance with one or more embodiments.

FIG. 7 illustrates an example of the task synthesis interface 702 for display on a client device. As shown the task synthesis system 102 provides a low-profile interface with summary information for the user that can remain unobtrusively on the display of the client device. In particular, this low-profile interface can present minimal graphical features to the user thereby providing minimal distraction on the client device.

As illustrated in FIG. 7, the task synthesis interface 702 can provide a minimal distraction on the client device yet provide pertinent and timely information relating to third-party data sources. For example, as shown, the interface includes a selectable option to open the synthesized task inbox (Open Inbox 704) graphical user interface and interact with synthesized tasks. Additionally, the interface can include visual notifications 706 of high-priority tasks (e.g., relatively high-priority tasks, urgent tasks, upcoming tasks, time sensitive tasks). The task synthesis interface 702 can also include pertinent notifications 708 of (and/or links to) current applications being accessed on the client device. As shown, in one or more embodiments, the task synthesis interface 702 has a low-profile that consolidates content associated with multiple third-party data sources for a concise display on the client device. The task synthesis interface 702 can also provide other pertinent information related to the task synthesis system 102 as needed.

In one or more embodiments, the task synthesis interface 702 is installed on a client device as a widget that is associated with a user account of the content management system and that is connected (e.g., via APIs) to the various third-party data sources. It is of note that in many instances, the task synthesis interface 702 can receive third-party data from the third-party data sources without the need to have the third-party data source active and running on the client device. Accordingly, the task synthesis interface 702 collects and displays important tasks, while eliminating or reducing data clutter.

Moreover, in one or more embodiments, task synthesis interface 702 acts as an urgent notification filter across all third-party data sources. To illustrate, existing systems typically provided notifications across all third-party data sources. This leads to a client device often being overwhelmed with notifications from the various data sources. However, the task synthesis interface 702 provides for consolidation of notifications in two ways. First, instead of receiving separate notifications from each third-party data source, the task synthesis interface 702 combines notifications from the third-party data sources into a single user interface. Second, the task synthesis system 102 then can filter and prioritize, per the principles discussed above, to only present relevant notifications in the task synthesis interface 702.

In one or more embodiments, the task synthesis system 102 can generate a new synthesized task, as described above. In addition, the task synthesis system 102 can determine a priority level (or an impact level) for the new synthesized task. Moreover, the task synthesis system 102 can determine whether a notification should be provided based on the priority level (or impact level) for the new synthesized task. In some examples, the task synthesis system 102 compares the priority score to a priority score associated with current user activity to determine to send a notification that may interrupt a user. For example, if the priority level (or impact level) of the new synthesized task indicates a higher urgency than a priority level (or impact level) associated with current user activity on the client device, then the task synthesis system 102 can send an urgent notification to the client device. On the other hand, if the priority level (or impact level) of the new synthesized task indicates a lower urgency than a priority level (or impact level) associated with current user activity on the client device, then the task synthesis system 102 can refrain from providing the notification until a future time. In one or more embodiments, the priority level (or impact level) associated with current user activity is based on determining the user activity is related to a synthesized task, and therefore, the priority level (or impact level) of the current user activity is based on the priority level (or impact level) of the synthesized task.

The above described task synthesis system 102 feature of monitoring multiple third-party data sources and providing a combined notification system allows users to remove or otherwise close various third-party applications on the client device while continuing to have the confidence that if an important content item is received from a third-party data source, the task synthesis system 102 will provide a notification. This results in an increase in computational efficiency as well as improved graphical user interface experiences that remove or at least reduce the amount of navigation needed for a user to be aware of important content items from the various third-party data sources.

Figure 8A:
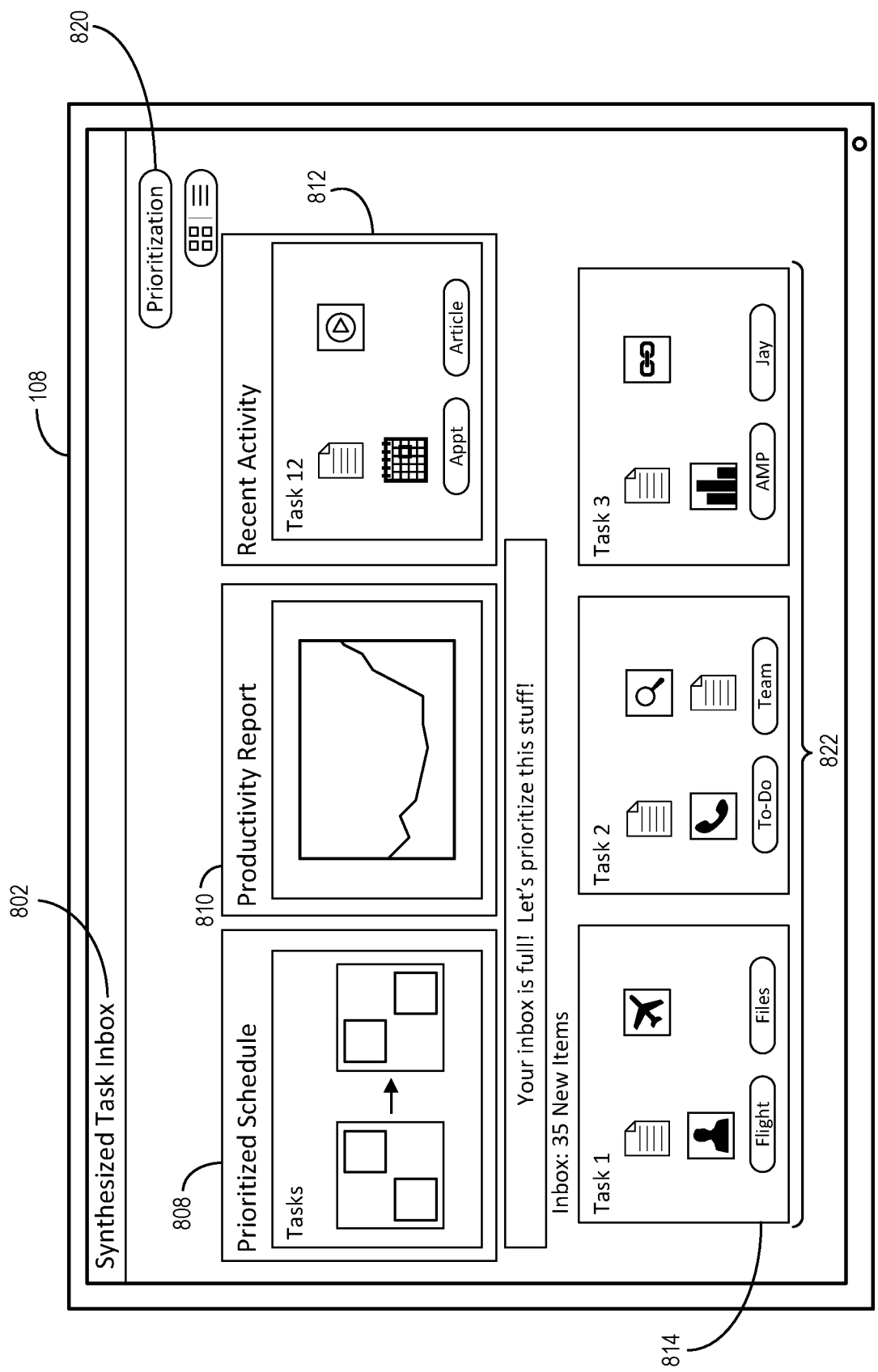
FIG. 8A-8E illustrate an example series of task synthesis system graphical user interfaces for managing, organizing, and reporting tasks according to one or more embodiments.
Figure 8B:
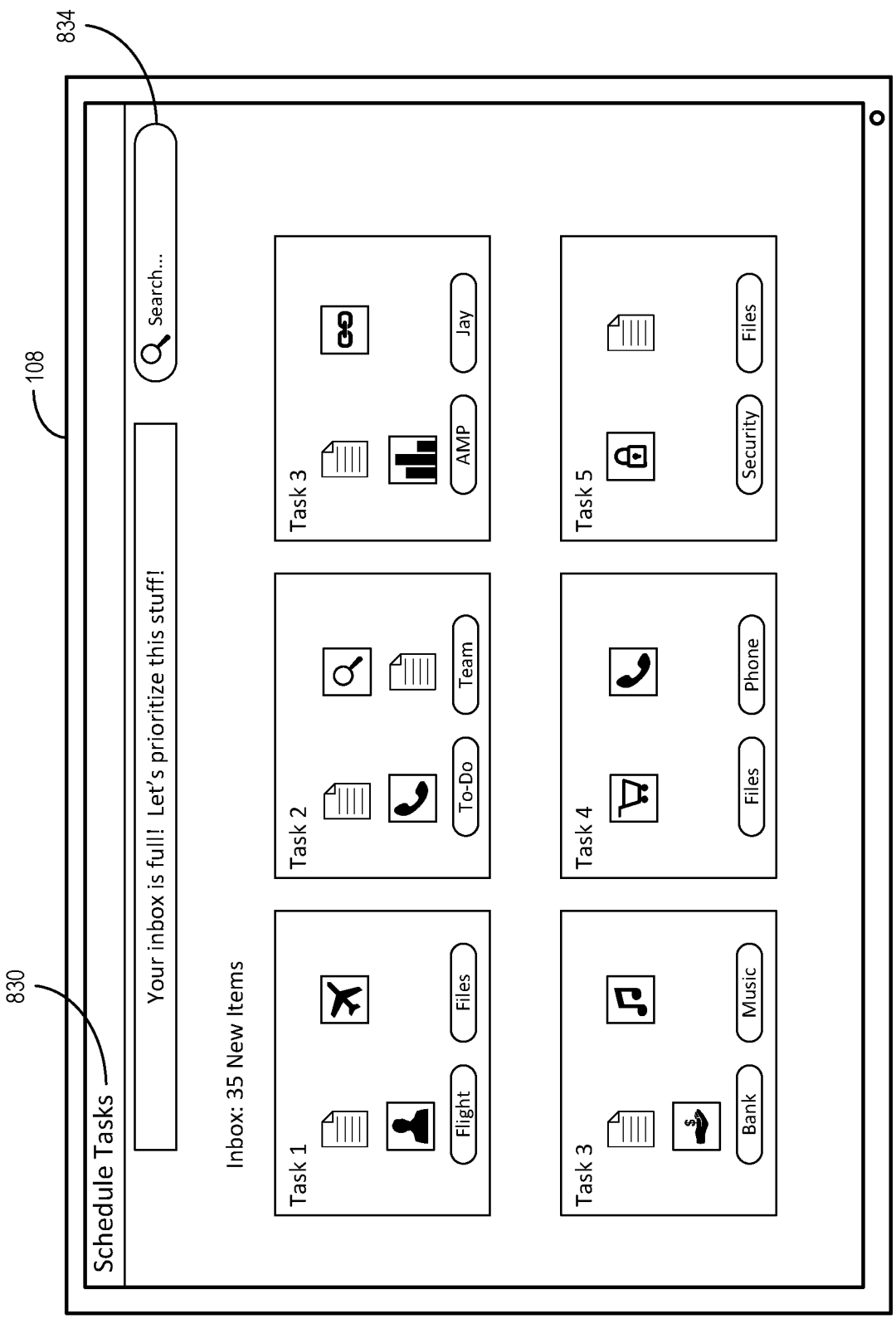
Figure 8C:
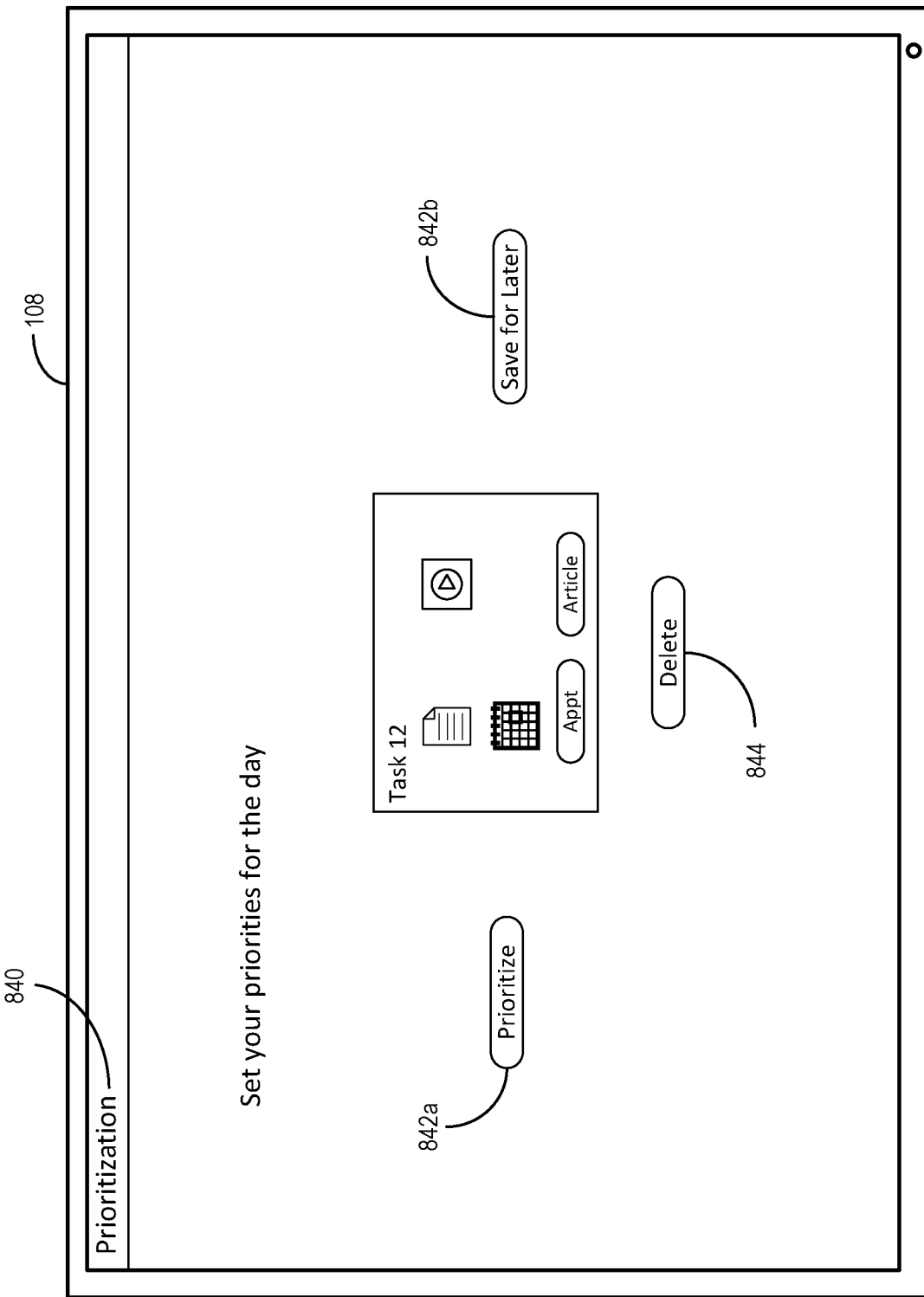
Figure 8D:
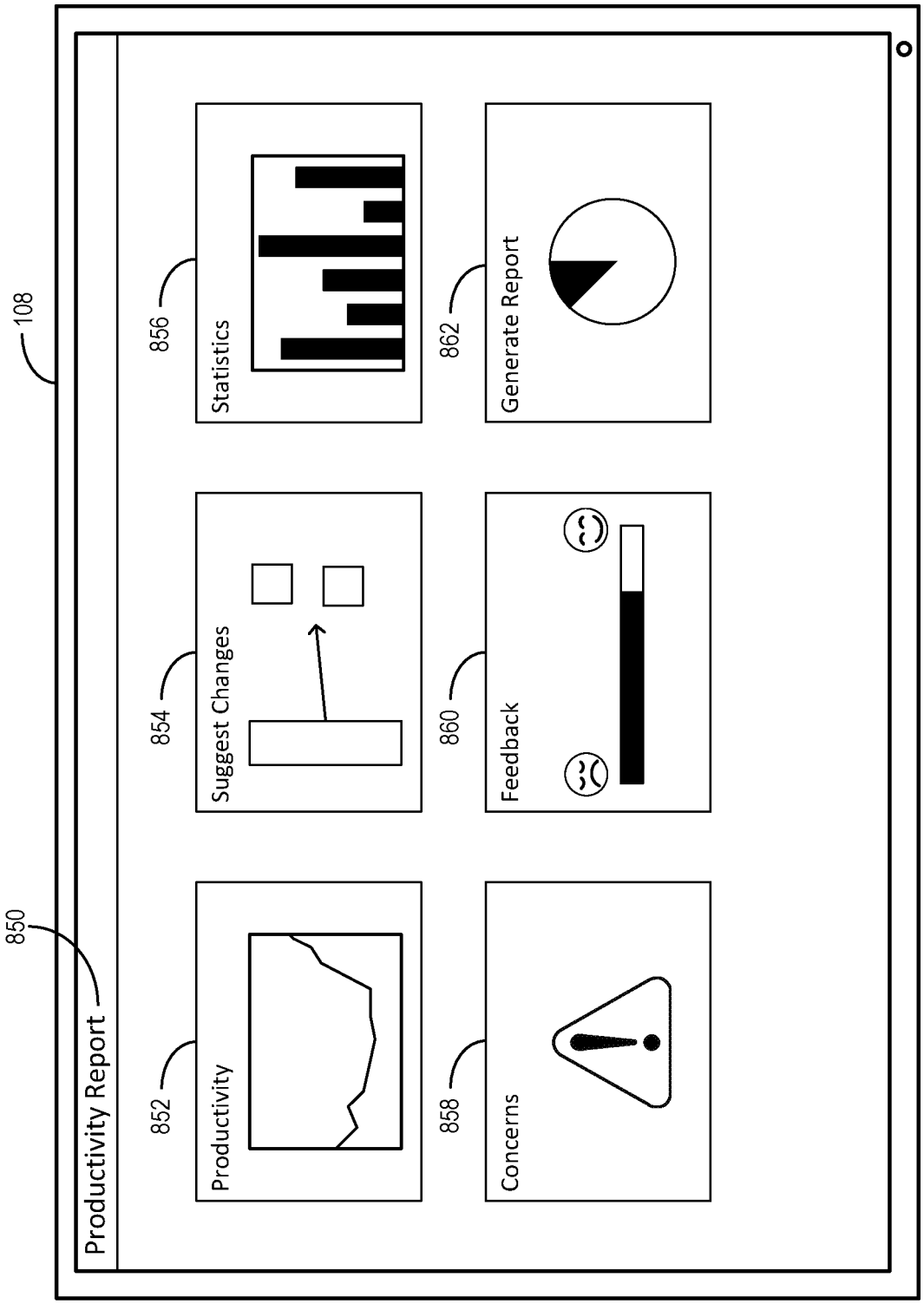

As mentioned above, the task synthesis system 102 includes a synthesized task inbox for interacting with the synthesized tasks through one consolidated graphical user interface. FIG. 8A illustrates an example synthesized task inbox in accordance with one or more embodiments. Thereafter, FIGS. 8B-8D illustrate how the user may interact with the synthesized task inbox. In some cases, the task synthesis system 102 performs prioritization, generates new tasks, modifies tasks, generates reports, and performs other functions described below in real time (or near real time) with user interactions selecting various interface elements to prompt the functions.

In one or more embodiments, task synthesis system 102 can provide graphical user interfaces to client devices via client applications installed thereon. For instance, FIG. 8A illustrates a synthesized task inbox 802 displayed on a screen of a client device 108. As illustrated in FIG. 8A, the client device 108 displays a synthesized task inbox 802 that includes interactive interface elements for managing the synthesized tasks associated with a user account.

As described previously, the task synthesis system 102 may organize related content within a synthesized task inbox 802. Related content within a synthesized task inbox 802 can comprise any content (including links to related information) from third-party sources. As illustrated in FIG. 8A, the task synthesis system 102 displays the synthesized task inbox 802. As shown, the synthesized task inbox 802 includes elements for displaying recent activity element 812, accessing a productivity report element 810, schedule tasks element 808, task prioritization element 820, and displaying synthesized task elements 822.

The task synthesis system 102 enables efficient and user-friendly management of content within the synthesized task inbox 802. For example, the recent activity element 812 provides a visual indicator (and easy access) to the recently accessed synthesized tasks. Generally, the recent activity element 812 lists historical content that has been accessed within the synthesized task inbox 802. For example, similar to a web browsing history, the recent activity collects data relating to accessed content from synthesized tasks. For instance, the recent activity element 812 may store and display associated data such as accessed content, patterns of activity, and times of access. In particular, the synthesized task inbox 802 provides the synthesized task elements 822 (or content cards that visually represent or depict the synthesized tasks) for display on the client device. As discussed above, the synthesized task elements 822 can include a representation of priority, a brief summary of the synthesized task, representations of third-party content, tags 814, and suggested actions.

Indeed, as mentioned, the task synthesis system 102 can also perform the suggested actions associated with the synthesized task. Indeed, the task synthesis system 102 can perform the suggested actions with a varying amount of user interaction. For example, the task synthesis system 102 can intelligently compose an email, schedule a meeting, modify a file, or generate a calendar item without further user interaction. As another example, the task synthesis system 102 can ask for user confirmation before performing the suggested actions associated with the synthesized tasks. As another example, the task synthesis system 102 can perform the initial steps in a suggested action and ask for user confirmation before completing the action (e.g., compose an email and ask for confirmation before sending, generate a proposed meeting time and attendee list and ask for confirmation before arranging the meeting). In this way, the task synthesis system can intelligently perform actions associated with the synthesized task.

Additionally, the synthesized task inbox 802 provides easy access to productivity reports by selecting the productivity report element 810 and as further described in reference to FIG. 8D. Based on detecting that the user has selected the schedule tasks element 808, the user can schedule (and modify) the synthesized tasks as further described in reference to FIG. 8B. The task prioritization element 820 allows the user to efficiently prioritize tasks as described in reference to FIG. 8C.

As illustrated in FIG. 8B, the task synthesis system 102 includes a schedule tasks interface 830. The task synthesis system 102 enables efficient and user-friendly management of content within the schedule tasks interface 830. For instance, the task synthesis system 102 may move content to different tasks, add content to particular tasks, divide tasks, set priority, schedule events, or delete tasks within the schedule tasks interface 830. For instance, as illustrated in FIG. 8B, the task synthesis system 102 may move the related content to any of the synthesized tasks based on detecting a user dragging and dropping the related content on another synthesized task.

The task synthesis system 102 also enables the search of contextually related content. As illustrated in FIG. 8B, the schedule tasks interface 830 graphical user interface includes a search element 834. The task synthesis system 102 may search content across all synthesized tasks listed within the schedule tasks interface 830 or within the task synthesis system 102.

Based on detecting that the user has selected the task prioritization element 820 shown on FIG. 8A, the client device can provide a task prioritization interface 840 as shown in FIG. 8C. The prioritization interface can include selectable options 842a and 842b for indicating the priority level associated with the plurality of synthesized tasks. In particular, the prioritization option can be a binary option that allows a single user interaction (e.g., click, selection) to prioritize the displayed synthesized task or save the synthesized task for later. For example, the prioritization option can provide the binary option to add the synthesized task to the priority list for that day or, conversely, to skip adding the synthesized task to the priority list for that day that is activated with a single user click of either selectable options 842a or 842b (i.e., after the single user click the next synthesized task could immediately be displayed in the task prioritization interface). In this manner, the prioritization option can allow a client device to efficiently prioritize a synthesized task inbox with minimal user interaction. Indeed, in one or more embodiments the prioritization interface can also incorporate additional delete element 844 that can add the option to remove a synthesized task quickly and efficiently from the synthesized task inbox from the prioritization interface.

As illustrated in FIG. 8D, the task synthesis system 102 can display a productivity report interface 850. As mentioned, the disclosed systems may provide task metrics concerning productivity associated with user interaction with the synthesized tasks. These reports can include reports for user productivity, suggestions, user statistics, possible issues, user feedback, or other synthesized task associated reporting. Generally, a productivity report 852 comprises an analysis of user productivity related to interaction with synthesized tasks over a time period. For example, the productivity report could include the number of synthesized tasks that were completed by the user, an amount of time the user spent on one or more of the synthesized tasks, a time of day when the user interacted with one or more of the synthesized task, or a day when the user interacted with one or more of the synthesized tasks.

The productivity report interface 850 includes a suggest changes report 854. Generally, the suggest changes report includes suggestions on improving productivity metrics related to synthesized tasks. For example, the suggestions could include options to modify synthesized tasks, add synthesized tasks, remove synthesized tasks, interact with urgent synthesized tasks during more productive time periods (e.g., times of the day that historically show more synthesized task interaction or completion). The suggestions could also include suggestions to granularly change content within individual synthesized tasks, add content to individual synthesized tasks, or remove content from individual synthesized tasks.

The productivity report interface 850 includes additional reports including: the statistics report 856, concerns report 858, and feedback report 860. Generally, the statistics report 856 includes statistics relating to synthesized tasks for a specified time period. For example, statistics could include the number of content items the user completed, the number of incomplete content items remaining, communications related to the user, an indication of the most productive time of day (or day of the week), or the amount of time the user spent interacting with the synthesized tasks within the date range. Generally, the concerns report 858 identifies possible concerns associated with the user's interaction with the synthesized tasks. The concerns report could suggest changes to alleviate concerns with synthesized tasks (e.g., suggestions to reprioritize, adjust, create, or remove content) or highlight areas where the synthesized tasks are not receiving user interaction. Generally, the feedback report 860 identifies feedback relating to the user's interaction with synthesized tasks. For example, the feedback report could provide content related to communications from other users about the user's interaction (e.g., completion, success) with synthesized tasks. The productivity report interface 850 also includes a generate report option 862 to allow the user to generate detailed report information concerning productivity over a time period.

Figure 8E:
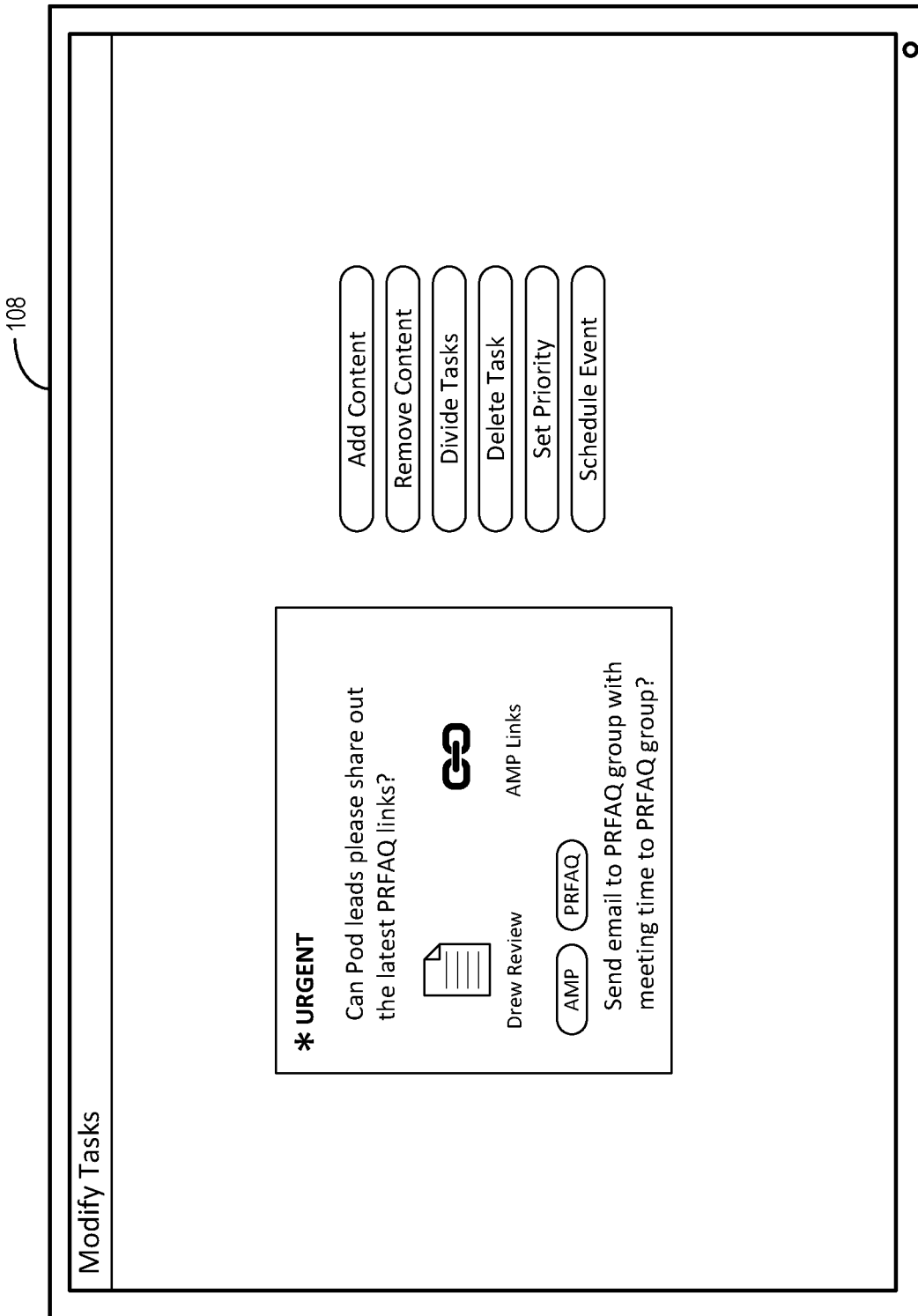

As further shown in FIG. 8E, the task synthesis system 102 can generate an urgent synthesized task based on monitoring third-party data sources. For example, the task synthesis system 102 can generate and prioritize a synthesized task based on new information received from one or more third-party data sources. If the prioritization of the synthesized task reaches above a particular threshold (e.g., at or above a priority score), then the task synthesis system 102 can provide a notification, such as shown in FIG. 8E that includes the synthesized task as well as any content, source, or category tags associated with the synthesized task. In addition, as shown in FIG. 8E, the task synthesis system 102 can generate a suggested action to perform, such as sending an email as illustrated in FIG. 8E.

In addition to providing an urgent synthesized task, FIG. 8E further indicates various actions a user can take to a synthesized task. For example, a user can add content or tags to a synthesized task by interacting with the add content option illustrated in FIG. 8E. Adding content can include adding tags or links to calendar events, emails, messages, documents, users, etc. Similarly, and as illustrated in FIG. 8E, the task synthesis system 102 can include a remove content option that, upon receiving an indication of a selection of the remove content item, can cause the task synthesis system 102 to disassociate previously associated content. For example, if a particular user identification was incorrectly tagged, the task synthesis system 102 can remove the user identification via the remove content option.

In addition to the add/remove content options, FIG. 8E further provides options for dividing a synthesized task. For example, upon receiving a user selection of the divide tasks option illustrated in FIG. 8E, the task synthesis system 102 can break a given synthesized task into two more subtasks associated with the synthesized task. In this way, a given user, for example, may not need to track the status of a first subtask so the first subtask can be deprioritized, while the same given user may need to prioritize a second subtask related to the synthesized task. Accordingly, the divide task options allows the task synthesis system 102 to further customize a given synthesized task.

As further shown in FIG. 8E, the graphical user interface includes a delete task option that allows a user to simply remove the synthesized task from the user account. Moreover, FIG. 8E illustrates a set priority option that allows a user to quickly redefine the priority of the urgent task. For example, the task synthesis system 102 could have predicted the synthesized task was urgent based on one or more factors, however, using the set priority option, a user can cause the task synthesis system 102 to redefine the priority level of the synthesized task as something different than urgent. Finally, FIG. 8E illustrates that the graphical user interface includes a schedule event option to allow the task synthesis system 102 to quickly provide an interface for scheduling a potential meeting or video conference based on generating the urgent synthesized task.

The components of the task synthesis system 102 can include software, hardware, or both. For example, the components of the task synthesis system 102 can include one or more instructions stored on a computer-readable storage medium and executable by processors of one or more computing devices. When executed by one or more processors, the computer-executable instructions of the task synthesis system 102 can cause a computing device to perform the methods described herein. Alternatively, the components of the task synthesis system 102 can comprise hardware, such as a special purpose processing device to perform a certain function or group of functions. Additionally, or alternatively, the components of the task synthesis system 102 can include a combination of computer-executable instructions and hardware.

Furthermore, the components of the task synthesis system 102 performing the functions described herein may, for example, be implemented as part of a stand-alone application, as a model of an application, as a plug-in for applications including content management applications, as a library function or functions that may be called by other applications, and/or as a cloud-computing model. Thus, the components of the task synthesis system 102 may be implemented as part of a stand-alone application on a personal computing device or a mobile device.

FIGS. 1-8, the corresponding text, and the examples provide a number of different systems and methods for generating and providing synthesized tasks using digital content from third-party data sources. In addition to the foregoing, implementations can also be described in terms of flowcharts comprising acts/steps in a method for accomplishing a particular result. For example, FIG. 9 illustrates an example series of acts for generating and providing a synthesized task from multiple third-party applications.

Figure 9:
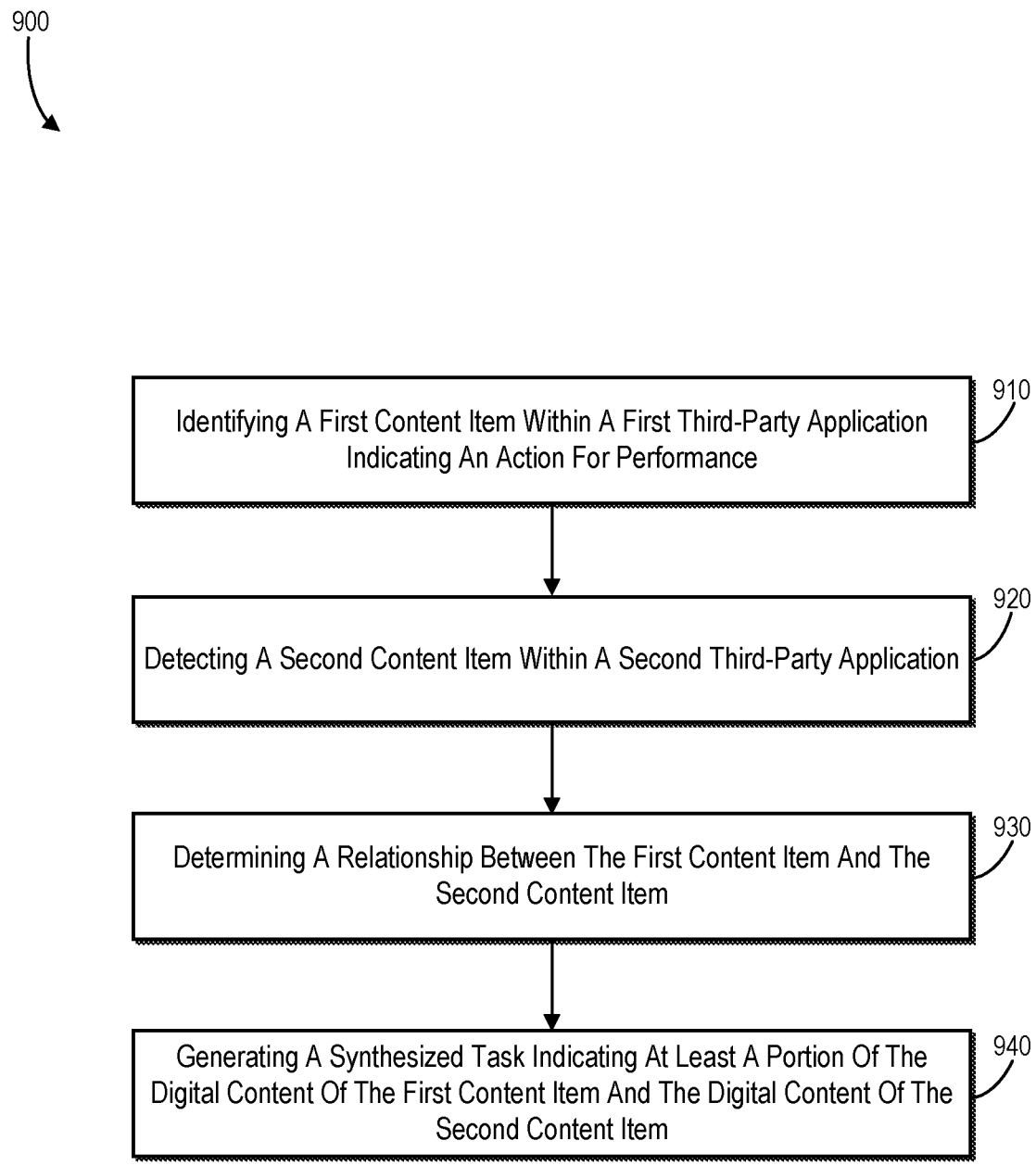
FIG. 9 illustrates a flowchart of a series of acts for identifying a synthesized task in accordance with one or more embodiments.

As illustrated in FIG. 9, the series of acts 900 may include an act 910 of identifying a first content item within a first third-party application indicating an action for performance. For example, in one or more embodiments, the act 910 can include the use of an API to monitor activity within a third-party application and identify a digital content item from the third-party application that indicates an action for performance via a client device associated with a user.

In addition, the series of acts 900 includes an act 920 of detecting a second content item within a second third-party application. Similar to act 920, in one or more embodiments, the act 920 can include the use of an API to monitor activity within a second third-party application and identify a second digital content item from the third-party application that indicates an action for performance via a client device associated with a user. In some cases, the act 920 can further include acts detecting multiple content items from multiple third-party applications. Furthermore, the act 920 can include further acts of detecting additional content items from the first third-party application.

As further illustrated in FIG. 9, the series of acts 900 includes an act 930 of determining a relationship between the first content item and the second content item. In one or more embodiments, as described above, the act 930 can involve using a machine learning model or natural language processing to determine the relationship between the first content item and the second content item. In one or more embodiments, the act 930 ranks the relationships and selects third-party content items that satisfy a threshold measure of relationship. In certain cases, the act 930 includes ranking the first and second content according to relevance and/or prominence of their relationships.

The series of acts 900 also includes an act 940 of generating a synthesized task indicating at least a portion of digital content of the first content item and the digital content of the second content item. In particular, the act 940 can generate a synthesized task based on a relationship between the entire digital content of the content items or based on a relationship between only part of the digital content of the content items. For example, the act 940 can utilize output from a machine learning model or a natural language processing system where the system not only identifies a relationship based on the entire content item, but also determines a relationship within a portion of the content item.

Figure 10:
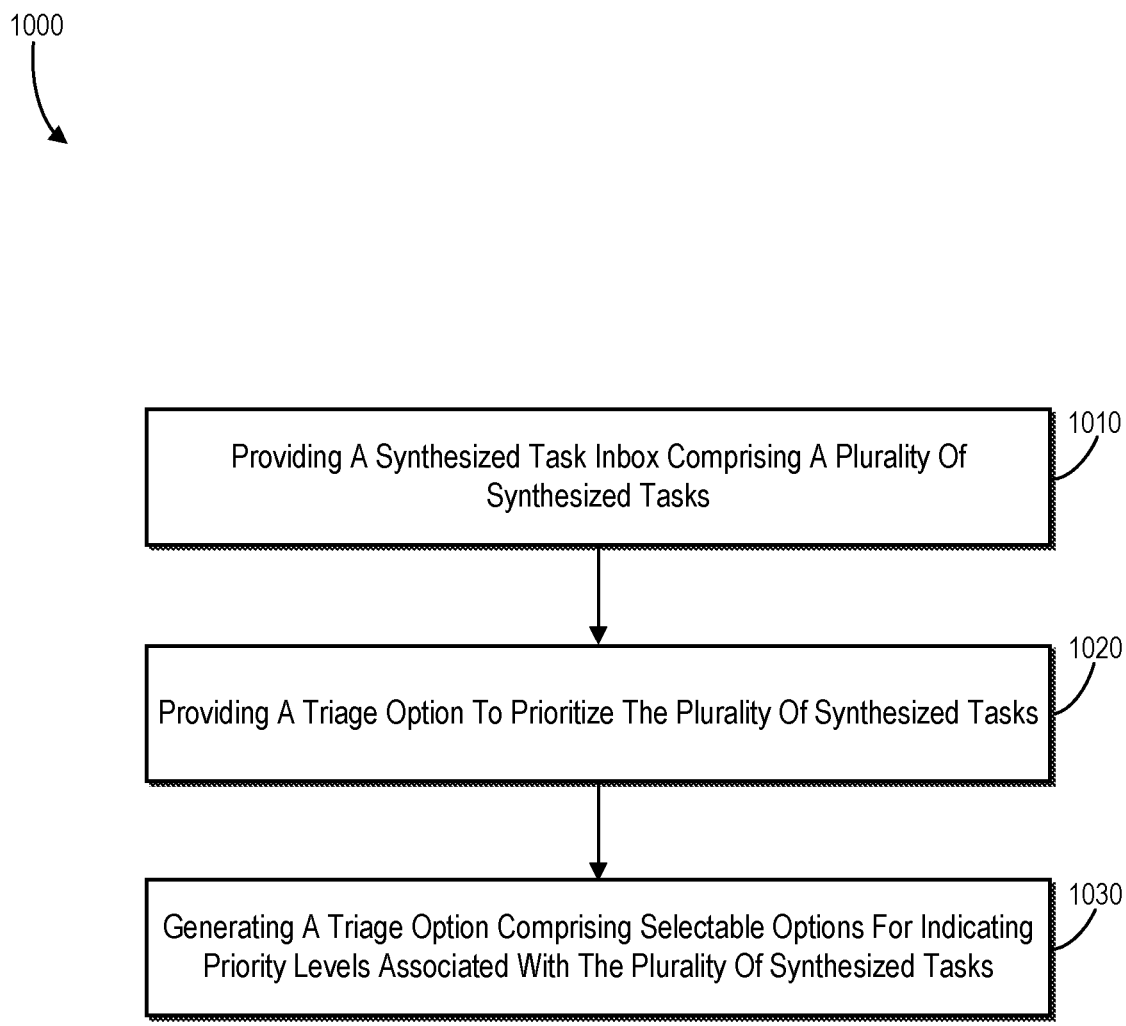
FIG. 10 illustrates a flowchart of a series of acts for providing a synthesized task inbox and prioritizing synthesized tasks in accordance with one or more embodiments.

Turning to FIG. 10. FIG. 10 illustrates an example series of acts 1000 for providing a synthesized task inbox and prioritizing the synthesized tasks within the synthesized task inbox. The series of acts 1000 can include the act 1010 of providing a synthesized task inbox comprising a plurality of synthesized tasks. In particular, the act 1010 can involve identifying digital content items from third-party data sources, determining relationships among the digital content items (or parts of digital content items), generating synthesized tasks based on the relationships, prioritizing the synthesized tasks, and providing the synthesized tasks to a client device for display in a synthesized task inbox. For example, the act 1010 can involve providing a synthesized task inbox comprised of multiple synthesized tasks grouping related third-party content items into synthesized tasks and providing these synthesized tasks to the user in one consolidated graphical user interface thereby avoiding the need for multiple third-party graphical user interfaces.

Further, the series of acts 1000 includes an act 1020 of providing a prioritization option to prioritize the plurality of synthesized tasks. In particular, the act 1030 can involve providing, along with the synthesized task inbox, a prioritization option to quickly and efficiently prioritize the synthesized task inbox.

In addition, the series of acts 1000 includes an act 1030 of generating a prioritization option comprising selectable options for indicating priority levels associated with the plurality of synthesized tasks. In particular, the act 1030 can involve, based on receiving an indication of a user interaction selecting a prioritization option, generating a prioritization infrastructure to accept user input and prioritize synthesized tasks. For example, the act 1030 may consist of a binary option to prioritize the synthesized task or deprioritize the synthesized task with one quick selection.

In one or more implementations, each of the components of the task synthesis system 102 are in communication with one another using any suitable communication technologies. Additionally, the components of the task synthesis system 102 can be in communication with one or more other devices including one or more client devices described above. It will be recognized that in as much the task synthesis system 102 is shown to be separate in the above description, any of the subcomponents may be combined into fewer components, such as into a single component, or divided into more components as may serve a particular implementation.

The components of the task synthesis system 102 can include software, hardware, or both. For example, the components of the task synthesis system 102 can include one or more instructions stored on a computer-readable storage medium and executable by processors of one or more computing devices (e.g., the computing device 1100). When executed by the one or more processors, the computer-executable instructions of the task synthesis system 102 can cause the computing device 1100 to perform the methods described herein. Alternatively, the components of the task synthesis system 102 can comprise hardware, such as a special purpose processing device to perform a certain function or group of functions. Additionally, or alternatively, the components of the task synthesis system 102 can include a combination of computer-executable instructions and hardware.

Furthermore, the components of the task synthesis system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the task synthesis system 102 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
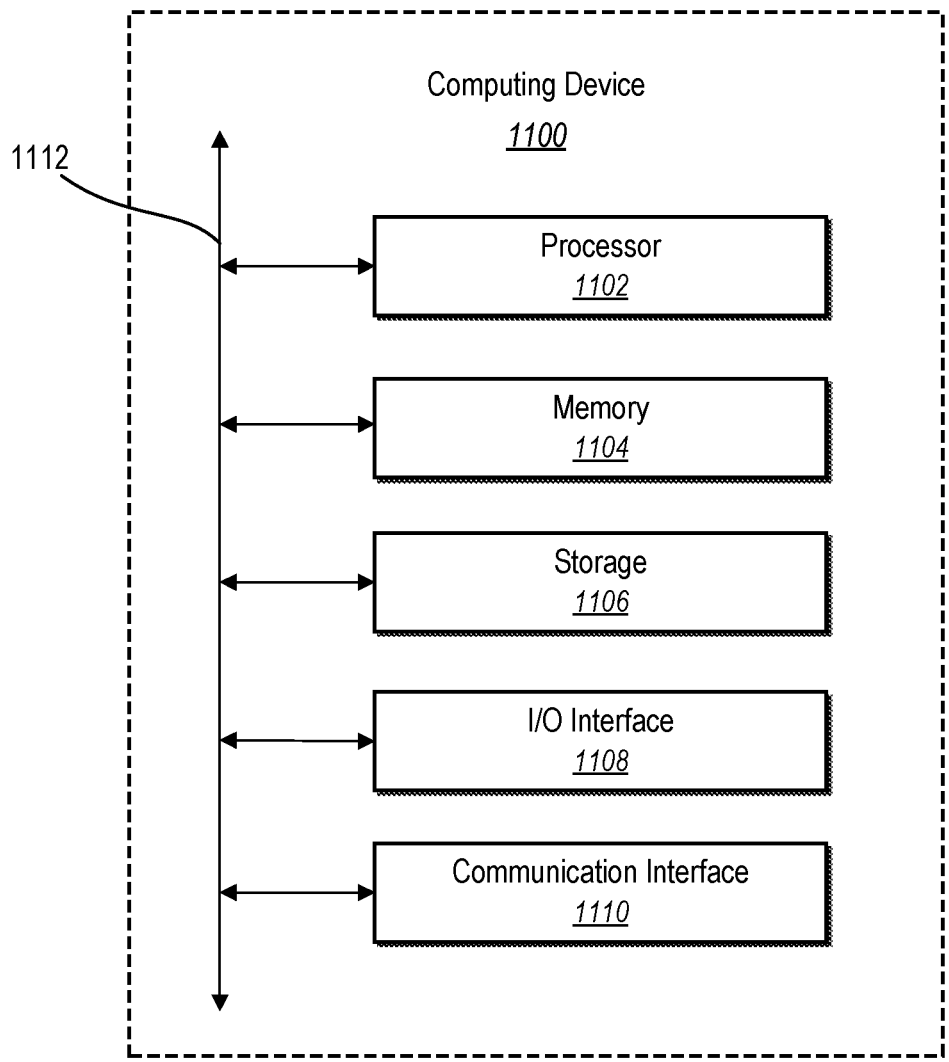
FIG. 11 illustrates a block diagram of an exemplary computing device in accordance with one or more embodiments.

FIG. 11 illustrates a block diagram of exemplary computing device 1100 that may be configured to perform one or more of the processes described above. One will appreciate that server(s) 104, the client device 108, and/or the computing device 1100 may comprise one or more computing devices such as computing device 1100. As shown by FIG. 11, computing device 1100 can comprise processor 1102, memory 1104, a storage device, a I/O interface, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
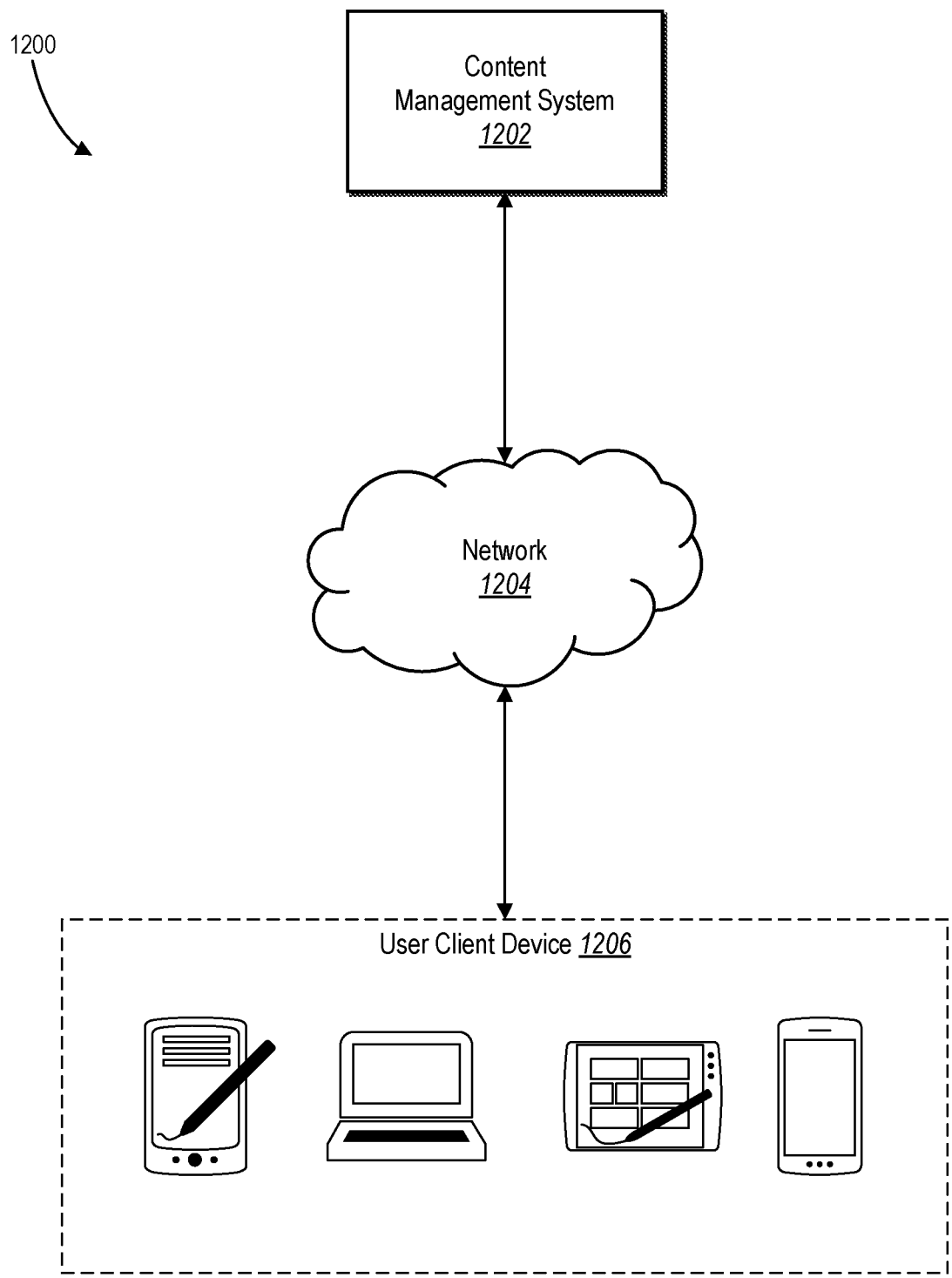
FIG. 12 illustrates a networking environment of a task synthesis system in accordance with one or more embodiments.

FIG. 12 is a schematic diagram illustrating environment 1200 within which one or more implementations of the task synthesis system 102 can be implemented. As discussed above with respect to FIG. 1, in some embodiments the task synthesis system can be part of a content management system. In such cases, the task synthesis system can perform various functions a content management system performs, as described below. The content management system 1202 may generate, store, manage, receive, and send digital content (such as digital videos). For example, content management system 1202 may send and receive digital content to and from client devices 1206 by way of network 1204. In particular, the content management system 1202 can store and manage a collection of digital content. The content management system 1202 can manage the sharing of digital content between computing devices associated with a plurality of users. For instance, the content management system 1202 can facilitate a user sharing a digital content with another user of content management system 1202.

In particular, the content management system 1202 can manage synchronizing digital content across multiple client devices 1206 associated with one or more users. For example, a user may edit digital content using client device 1206. The content management system 1202 can cause client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device 1206 only stores reduced-sized versions of the digital content. A user can navigate and browse the reduced-sized versions (e.g., a thumbnail of a digital image) of the digital content on client device 1206. In particular, one way in which a user can experience digital content is to browse the reduced-sized versions of the digital content on client device 1206.

Another way in which a user can experience digital content is to select a reduced-size version of digital content to request the full- or high-resolution version of digital content from content management system 1202. In particular, upon a user selecting a reduced-sized version of digital content, client device 1206 sends a request to content management system 1202 requesting the digital content associated with the reduced-sized version of the digital content. Content management system 1202 can respond to the request by sending the digital content to client device 1206. Client device 1206, upon receiving the digital content, can then present the digital content to the user. In this way, a user can have access to large collections of digital content while minimizing the amount of resources used on client device 1206.

Client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   providing, for display on a client device, a synthesized task inbox comprising a plurality of synthesized tasks associated with a user account and generated from one or more content items corresponding to different third-party applications;
   providing, for display on the client device together with the synthesized task inbox, a prioritization option selectable to prioritize the plurality of synthesized tasks;
   in response to receiving an indication of a selection of the prioritization option, generating a prioritization interface for display on the client device, the prioritization interface comprising a first synthesized task from the plurality of synthesized tasks displayed in combination with selectable prioritization options for indicating a priority level associated with the first synthesized task; and
   based on receiving a selection of a prioritization option for the first synthesized task, providing for display within the prioritization interface, a second synthesized task from the plurality of synthesized tasks in combination with the selectable prioritization options.

2. The computer-implemented method of claim 1, further comprising:
   determining a plurality of priority scores corresponding to the plurality of synthesized tasks;
   prioritizing the plurality of synthesized tasks based on the plurality of priority scores; and
   providing, for display on the client device, the synthesized task inbox sorted based on the prioritization of the plurality of synthesized tasks.

3. The computer-implemented method of claim 1, further comprising:
   determining a priority score for each of the plurality of synthesized tasks;
   filtering the plurality of synthesized tasks based on comparing the priority score for each of the plurality of synthesized tasks to a threshold priority score;
   providing, for display on the client device, a first subset of synthesized tasks from the plurality of synthesized tasks based on the first subset of synthesized tasks having priority scores that meet the threshold priority score; and
   refraining, from providing for display on the client device, a second subset of synthesized tasks from the plurality of synthesized tasks based on the second subset of synthesized tasks having priority scores that do not meet the threshold priority score.

4. The computer-implemented method of claim 1, further comprising:
   based on receiving, via the synthesized task inbox, an indication of user interaction with the first synthesized task, providing one or more options in combination with the first synthesized task, the one or more options comprising:
   a combine task option to combine the first synthesized task with one or more additional synthesized tasks; or
   a divide task option to generate two or more separate synthesized tasks from the first synthesized task.

5. The computer-implemented method of claim 1, wherein the selectable prioritization options for indicating priority levels comprises a ternary structure comprising a prioritize option, a deprioritize option, and a delete option.

6. The computer-implemented method of claim 1, wherein providing, for display on the client device, the synthesized task inbox comprising the plurality of synthesized tasks comprises providing a first synthesized task element related to a first synthesized task from the plurality of synthesized tasks, wherein the first synthesized task element comprises a category tag that references a type of action associated with the first synthesized task.

7. The computer-implemented method of claim 1, wherein providing, for display on the client device, the synthesized task inbox comprising the plurality of synthesized tasks comprises providing a first synthesized task element related to a first synthesized task from the plurality of synthesized tasks, wherein the first synthesized task element comprises a content tag that references a digital document associated with the first synthesized task.

8. The computer-implemented method of claim 7, further comprising:
receiving an indication of a user interaction with the content tag associated with the first synthesized task; and
in response to the indication of the user interaction with the content tag, providing, for display on the client device, the digital document based on the content tag comprising a link to a storage location of the digital document.

9. The computer-implemented method of claim 1, further comprising:
receiving an indication of user activity on the client device associated with a first synthesized task from the plurality of synthesized tasks; and
modifying a status of the first synthesized task based on the user activity.

10. A system comprising:
at least one processor; and
a non-transitory computer readable medium comprising instructions that, when executed by the at least one processor, cause the system to:
provide, for display on a client device, a synthesized task inbox comprising a plurality of synthesized tasks associated with a user account and generated from one or more content items corresponding to different third-party applications;
provide a prioritization option within the synthesized task inbox, the prioritization option being selectable to prioritize the plurality of synthesized tasks;
in response to receiving an indication of a selection of the prioritization option, provide a prioritization interface for display on the client device, the prioritization interface comprising a first synthesized task from the plurality of synthesized tasks displayed in combination with selectable prioritization options for indicating a priority level associated with the first synthesized task; and
based on receiving a selection of a first prioritization option for the first synthesized task, assign the first synthesized task to a first prioritization associated with the first prioritization option.

11. The system as recited in claim 10, wherein the first prioritization comprises one of: prioritize, save for later, or delete.

12. The system as recited in claim 10, further comprising instructions that, when executed by the at least one processor, cause the system to:
assign a priority level to each synthesized task of the plurality of synthesized tasks based on receiving indications of user selections of a prioritization option for each synthesized task; and
provide, for display on the client device, a prioritized list of synthesized tasks based on the priority level corresponding to each synthesized task.

13. The system as recited in claim 10, further comprising instructions that, when executed by the at least one processor, cause the system to:
generate a productivity report by monitoring user activity corresponding to one or more of the plurality of synthesized tasks, wherein the productivity report comprises:
a number of completed synthesized tasks;
a number of incomplete synthesized tasks; or
an amount of time associated with at least one synthesized task; and
provide the productivity report for display on the client device.

14. The system as recited in claim 10, wherein providing, for display on the client device, the synthesized task inbox comprising the plurality of synthesized tasks comprises providing a first synthesized task element related to a first synthesized task from the plurality of synthesized tasks, wherein the first synthesized task element comprises a source tag that references a third-party application associated with the first synthesized task.

15. The system as recited in claim 10, further comprising instructions that, when executed by the at least one processor, cause the system to:
determine a plurality of priority scores corresponding to the plurality of synthesized tasks;
prioritize the plurality of synthesized tasks based on the plurality of priority scores; and
provide, for display on the client device, the synthesized task inbox sorted based on the prioritization of the plurality of synthesized tasks.

16. A non-transitory computer readable medium comprising instructions that, when executed by at least one processor, cause a computing device to:
provide, for display on a client device, a synthesized task inbox comprising a plurality of synthesized tasks associated with a user account and generated from one or more content items corresponding to different third-party applications;
provide a prioritization option within the synthesized task inbox, the prioritization option being selectable to prioritize the plurality of synthesized tasks;
in response to receiving an indication of a selection of the prioritization option, provide a prioritization interface for display on the client device, the prioritization interface comprising a first synthesized task from the plurality of synthesized tasks displayed in combination with selectable prioritization options for indicating a priority level associated with the first synthesized task; and
based on receiving a selection of a first prioritization option for the first synthesized task, assign the first synthesized task to a first prioritization associated with the first prioritization option.

17. The non-transitory computer readable medium of claim 16, further comprising instructions that, when executed by the at least one processor, cause the computing device to further provide, for display on the client device, a second synthesized task within the prioritization interface based on receiving the selection of the first prioritization option for the first synthesized task.

18. The non-transitory computer readable medium of claim 16, further comprising instructions that, when executed by the at least one processor, cause the computing device to:
- receive an indication of user activity on the client device associated with a first synthesized task from the plurality of synthesized tasks; and
- modify a status of the first synthesized task based on the user activity, wherein modifying the status of the first synthesized task comprises modifying the status from an incomplete status to a complete status.

19. The non-transitory computer readable medium of claim 16, further comprising instructions that, when executed by the at least one processor, cause the computing device to:
- assign a priority level to each synthesized task of the plurality of synthesized tasks based on receiving indications of user selections of a prioritization option for each synthesized task; and
- provide, for display on the client device, a prioritized list of synthesized tasks based on the priority level corresponding to each synthesized task.

20. The non-transitory computer readable medium of claim 16, wherein the selectable prioritization options for indicating priority levels comprises a ternary structure comprising a prioritize option, a deprioritize option, and a delete option.

* * * * *